(12) United States Patent
Kuwahara

(10) Patent No.: US 6,756,870 B2
(45) Date of Patent: Jun. 29, 2004

(54) COMPOSITE MAGNET OF ELECTROMAGNET AND PERMANENT MAGNET, AND EDDY CURRENT RETARDER

(75) Inventor: Tohru Kuwahara, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 263 days.

(21) Appl. No.: 09/953,928

(22) Filed: Sep. 18, 2001

(65) Prior Publication Data

US 2002/0033746 A1 Mar. 21, 2002

(30) Foreign Application Priority Data

| Sep. 18, 2000 | (JP) | ........................................ 2000-281969 |
| Oct. 19, 2000 | (JP) | ........................................ 2000-319579 |
| Oct. 30, 2000 | (JP) | ........................................ 2000-331160 |

(51) Int. Cl.[7] .............................................. H01F 7/08
(52) U.S. Cl. ........................ 335/224; 310/105; 310/181
(58) Field of Search .......................... 310/93, 105, 181; 335/224

(56) References Cited

U.S. PATENT DOCUMENTS

| 3,064,149 A | * | 11/1962 | Baermann ..................... 310/93 |
| 3,601,641 A | * | 8/1971 | Baermann ..................... 310/93 |
| 3,624,438 A | * | 11/1971 | Hoyler ........................ 310/93 |
| 3,889,140 A | | 6/1975 | Baermann |
| 4,578,609 A | * | 3/1986 | McCarty ................. 310/156.24 |
| 4,678,182 A | * | 7/1987 | Nakao et al. ................... 482/9 |
| 5,096,024 A | * | 3/1992 | Wu ............................. 188/267 |

FOREIGN PATENT DOCUMENTS

| JP | 57 107013 | 7/1982 | |
| JP | 04281361 A | * 10/1992 | .......... H02K/49/10 |

* cited by examiner

*Primary Examiner*—Lincoln Donovan
*Assistant Examiner*—Bernard Rojas

(57) ABSTRACT

A composite magnet has an iron core, a coil around the iron core, and a permanent magnet in the iron core. A first eddy current retarder includes a brake drum with a rotatable shaft, and a stationary magnet unit inside the inner peripheral surface of the brake drum and having an annular base portion, iron core portions, a support member having magnetic pole pieces at the ends of the iron core portions and opposed to the brake drum, electromagnets, and a permanent magnet in each of the iron core portions with its magnetic pole surface directed in the radial direction. A second eddy current retarder includes a stationary brake drum, an annular magnet support member coupled to a rotatable shaft and inside the inner peripheral surface of the brake drum, and magnets outside the magnet support member and opposed to the surface of the brake drum.

8 Claims, 28 Drawing Sheets

COMPOSITE MAGNET OF ELECTROMAGNET AND PERMANENT MAGNET, AND EDDY CURRENT RETARDER

FIELD OF THE INVENTION

The present invention relates to a composite magnet of electromagnet and permanent magnet, comprising an iron core, a coil arranged to surround the outer peripheral surface of the iron core, and a permanent magnet mounted in the iron core in a manner that the magnetic pole is in agreement with the direction of magnetization of the iron core. The invention further relates to an eddy current retarder used for assisting the foot brake which is the main brake of a vehicle such as a truck, i.e., to an eddy current retarder equipped with the composite magnet of electromagnet and permanent magnet. The invention further relates to an eddy current retarder used for assisting the foot brake which is the main brake of a vehicle such as a truck, and to an eddy current retarder in which annular members made of a good conductor such as copper, a copper alloy or the like is coupled to the brake drum.

DESCRIPTION OF THE PRIOR ART

Japanese Examined Utility Model Publication (Kokoku) No. 44930/1988 discloses a composite magnet of electromagnet and permanent magnet comprising an iron core, a coil arranged to surround the outer peripheral surface of the iron core, and a permanent magnet mounted in the iron core in a manner that the magnetic pole is in agreement with the direction of magnetization of the iron core. A groove extending in the axial direction is formed in a part in the outer periphery of the iron core in the circumferential direction, the groove being formed at an intermediate portion in the axial direction or extending from one end to the other end in the axial direction. A permanent magnet is fitted into the groove.

A permanent magnet (e.g., ferrite magnet, rare-earth magnet) has a magnetic permeability smaller than that of the iron core (usually, a low-carbon iron material). In the above-mentioned composite magnet, since a permanent magnet having a low magnetic permeability is attached to a portion in the outer periphery of the iron core in the circumferential direction, the magnetic flux formed in the iron core cannot be sufficiently efficiently collected to one of the magnetic pole surfaces of the iron core when the iron core is magnetized by supplying a current to the coil. That is, since a permanent magnet having a low magnetic permeability is mounted on a portion in the outer periphery of the iron core in the circumferential direction, a portion in the outer periphery of the iron core in the circumferential direction is shut off in the direction of magnetization, the flow of magnetic flux formed in a portion of the outer periphery of the iron core is interrupted by the permanent magnet, and the magnetic flux formed in a portion in the outer periphery of the iron core is not efficiently guided as desired to one of the magnetic pole surfaces of the iron core. Further, the region of the iron core where the permanent magnet exists becomes remote from a portion of the coil in the radial direction, and the magnetic flux corresponding to the current supplied to the coil can not be efficiently generated. When the iron core is magnetized by supplying a current to the coil, therefore, the magnetic flux is not very efficiently generated in the iron core and hence, performance of the electromagnet is not utilized to a sufficient degree.

Besides, since the permanent magnet is mounted on a portion of the outer periphery of the iron core in the circumferential direction thereof, it is not allowed to sufficiently increase the sectional area of the permanent magnet as desired and hence, the permanent magnet cannot be effectively utilized. Summarizing the foregoing, neither the electromagnet nor the permanent magnet is effectively utilized. Due to that neither electromagnet nor the permanent magnet is effectively utilized, the length of the electromagnet (iron core and coil) increases in the direction of magnetization, the composite magnet as a whole becomes of larger size, the weight increases, and the cost of production increases, too. The transverse sectional area of the iron core at a portion where the permanent magnet is mounted becomes considerably larger than the transverse sectional area of the permanent magnet. When the magnetizing force is applied for magnetization after the permanent magnet before magnetized has been incorporated in the iron core, therefore, much magnetic flux flows into the iron core, and the permanent magnet is not sufficiently magnetized as desired. To solve this inconvenience, the permanent magnet after magnetized must be mounted on the iron core, requiring a cumbersome assembling operation. Besides, due to the constitution in which the permanent magnet is mounted on a portion of the outer peripheral edge of the iron core in the circumferential direction, the permanent magnet cannot be formed in a simple transverse sectional shape such as a circular shape or a rectangular shape. Moreover, it is relatively difficult to form a groove in the outer periphery of the iron core, resulting in increase in the manufacture cost. In the above composite magnet, further, the permanent magnet which is a relatively long requires an increased cost for the material.

Typical examples of the eddy current retarder using a permanent magnet include the one in which a magnet support cylinder having plural permanent magnets arranged in the outer peripheral surface thereof is moved into or out of the brake drum to make a changeover between braking and non-braking (see Japanese Laid-open Patent Application (Kokai) No. 14782/1994 (JP-A 6-14782)) and the one in which a magnet support cylinder having plural permanent magnets arranged in the outer peripheral surface thereof is rotated forward or reverse inside the brake drum to make a changeover between braking and non-braking (see Japanese Laid-open Patent Application (Kokai) No. 83571/1994 (JP-A 6-83571))(both of these applications were developed and filed by Isuzu Motor Co.). These eddy current retarders require an actuator for moving the magnet support cylinder. As the actuator, there can be employed a pneumatic cylinder, a hydraulic cylinder, an electric motor or a linear motor. Therefore, the device as a whole becomes of larger size and heavy in weight and increases cost. In the eddy current retarder using an electromagnet (see Japanese Laid-open Patent Application (Kokai) No. 327227/1994 (JP-A 6-327227)), on the other hand, there is no need of moving the electromagnet; i.e., applying the brake and not applying the brake can be changed over by simply controlling the electric current supplied to the coil of the electromagnet and hence, the above-mentioned actuator is not required. However, the device becomes considerably large sized and heavy, compared with the eddy current retarder using the permanent magnet.

Japanese Laid-open Patent Application (Kokai) No. 243627/1998 (JP-A 10-243627) that was developed and filed by Isuzu Motor Co. Ltd. discloses an eddy current retarder in which a brake drum is equipped with annular members made of a good conductor such as copper, a copper alloy or the like. The eddy current retarder includes a brake drum coupled to a rotary shaft and a stationary guide cylinder arranged on the inside of the brake drum in the radial direction. The stationary guide cylinder formed chiefly of a nonmagnetic material constitutes a nearly rectangular inner space inclusive of an outer wall surface and an inner wall surface. Plural ferromagnetic plates are arranged at intervals on the outer peripheral wall of the stationary guide cylinder that is so disposed, maintaining a gap, as to be opposed to the inner peripheral surface of the brake drum. In the inner space of the stationary guide cylinder is supported a magnet support cylinder so as to be moved in the axial direction by the actuator. Plural permanent magnets are arranged on the outer peripheral portion of the magnet support cylinder at intervals in the circumferential direction so as to be opposed to the ferromagnetic plates. Magnetic pole surfaces of the permanent magnets are directed in the radial direction, and the permanent magnets neighboring in the circumferential direction are so disposed that each of the magnetic pole surfaces has an opposite polarity to each other. An annular member made of a good conductor such as copper or a copper alloy is coupled to at least one end of the inner peripheral edge of the brake drum in the axial direction. The magnet support cylinder is selectively brought by the actuator to a braking position where the permanent magnets are opposed to the ferromagnetic plates arranged on the outer peripheral wall of the stationary guide cylinder on the inside of the brake drum in the radial direction and to a non-braking position where the permanent magnets are retracted outward in the axial direction from the inside of the brake drum in the radial direction and from the ferromagnetic plates.

When the brake drum being formed of an iron or a steel having a relatively large magnetic permeability and the magnet support cylinder is brought to the braking position by the actuator, a magnetic circuit is formed between the permanent magnets neighboring on the magnet support cylinder in the circumferential direction and the brake drum, via the ferromagnetic plates of the stationary guide cylinder. At this moment, a braking force is produced in the brake drum due to an eddy current that generates in the rotary brake drum. As described above, since the annular member made of a good conductor such as copper or a copper alloy, i.e., the annular member made of a material having a high electric conductivity is coupled to at least one end of the inner peripheral edge of the brake drum in the axial direction, an eddy current that generates increases and a braking force increases due to a combined action with that of the brake drum made of a material having a large permeability.

However, when the annular member made of a good conductor such as copper or a copper alloy is coupled to at least one end of the inner peripheral edge of the brake drum in the axial direction, there is a likelihood that the eddy current may concentrate in the annular member to make the annular member and the brake drum a high temperature. The electric resistance increases with an increase in the temperature of the annular member and of the brake drum, whereby the eddy current that generates in the brake drum decreases and hence, the braking force decreases. It is further probable that heat-deterioration of the annular member that works to increase the eddy current is promoted, whereby the braking force decreases and, besides, the annular member loses durability. Further, the copper member constituting the annular member has a coefficient of thermal expansion larger than that of the iron material or the steel material constituting the brake drum and hence, there is a probability that the junction portion between the annular member and the brake drum may peel off or may be cracked to spoil the durability. Besides, in case the brake drum is thermally expanded excessively, the thermal stress greatly increases in the annular member. When the centrifugal force is repetitively exerted in a state where the brake drum is revolving at high speeds, therefore, there is a probability that the junction portion between the annular member and the brake drum may be peeled off or cracked to spoil the durability.

SUMMARY OF THE INVENTION

An object of the present invention is to provide a novel composite magnet of electromagnet and permanent magnet, which makes it possible to effectively use both of the electromagnet and the permanent magnet.

Another object of the present invention is to provide a novel composite magnet of electromagnet and permanent magnet, which enables the length of the electromagnet in the direction of magnetization to be shortened compared to the length of the conventional counterpart, when it is supposed that the magnetic flux generated from one magnetic pole surface at the time of supplying a current to a coil is the same as that of the conventional counterpart.

A further object of the present invention is to provide a novel composite magnet of electromagnet and permanent magnet, which enables the whole constitution to be made in a compact size and in a decreased weight, and enables the production cost to be decreased.

A still further object of the present invention is to provide a novel composite magnet of electromagnet and permanent magnet, which enables the permanent magnet to be magnetized to a sufficient degree as desired after the permanent magnet before magnetized has been incorporated in the iron core, facilitating the operation for assembling the permanent magnet in the iron core.

A yet further object of the present invention is to provide a novel composite magnet of electromagnet and permanent magnet, which enables the permanent magnet to be formed in a simple shape in cross section and enables the composite magnet to be produced at a relatively low cost without requiring the formation of grooves in a portion of the outer periphery of the iron core in the circumferential direction.

A further object of the present invention is to provide a novel composite magnet of electromagnet and permanent magnet, which is capable of changing over between braking and non-braking as well as controlling the braking force by simply controlling the current flowing into the coil without using actuator and further enables the eddy current retarders to be made in a small size and in a reduced weight, compared to the conventional eddy current retarders utilizing the electromagnets.

Another object of the present invention is to provide a novel composite magnet of electromagnet and permanent magnet, which enables an amount of an eddy current generated in the brake drum and a braking torque to be increased by preventing the annular member and the brake drum from being heated at high temperatures.

A further object of the present invention is to provide a novel composite magnet of electromagnet and permanent magnet, which makes it possible to secure a desired durability to a sufficient degree.

According to one aspect of the present invention, there is provided a composite magnet of electromagnet and permanent magnet comprising an iron core, a coil arranged to surround the outer peripheral surface of the iron core, and a permanent magnet mounted in the iron core in a manner that the magnetic pole is in agreement with the direction of magnetization of the iron core, wherein the permanent magnet is mounted in a number of one or in a plural number in the iron core in a manner that at least the outer peripheral surfaces thereof are surrounded by the iron core.

It is desired that the permanent magnet is mounted in one end portion and/or in the other end portion of the iron core in the direction of magnetization.

It is desired that the end surface of the permanent magnet mounted in one end portion and/or the other end portion of the iron core in the direction of magnetization on the side same as the one end and/or the other end of the iron core is covered with a magnetic pole plate attached to one end and/or the other end of the iron core.

It is desired that the iron core is divided into two at an intermediate portion thereof in the direction of magnetization along the transverse cross section and that the permanent magnet is mounted across the ends of the iron cores facing each other.

It is desired that a magnetic pole portion is formed as a unitary structure at the other end of the iron core so as to extend outward in the radial direction or a magnetic pole plate is attached thereto.

It is desired that a through hole extending in the direction of magnetization is formed in the iron core, a permanent magnet is disposed at one end portion and/or the other end portion or in the intermediate portion of the through hole, a bar member made of a ferromagnetic material is disposed in the through hole in a region other than the region where the permanent magnet is disposed, magnetic pole plates are attached to the one end and to the other end of the iron core, and a nonmagnetic region is formed between the outer peripheral surfaces of the permanent magnet and of the bar member and the inner peripheral surface of the through hole over substantially the whole region in the axial direction.

It is desired that a one end-closed hole extending in the direction of magnetization is formed in the iron core, one end of said one end-closed hole being open at one end of the iron core and being closed at the other end, a permanent magnet is disposed in the open end of the one end-closed hole, a bar member made of a ferromagnetic material is disposed in the one end-closed hole in a region other than the region where the permanent magnet is disposed, a magnetic pole plate is attached to the one end of the iron core, a magnetic pole portion is formed as a unitary structure on the other end of the iron core so as to protrude outward in the radial direction or a magnetic pole plate is attached thereto, and a non-magnetic region is formed between the outer peripheral surfaces of the permanent magnet and of the bar member and the inner peripheral surface of the one end-closed hole over substantially the whole region in the axial direction.

It is desired that the nonmagnetic region is formed by a cylindrical hollow portion formed over the whole region in the axial direction, or formed by a cylindrical hollow portion formed in part of the region in the axial direction and nonmagnetic hollow member inserted in other region, or formed by a nonmagnetic hollow member inserted in the whole region in the axial direction.

It is desired that a recessed portion is formed in one inner side surface and/or the other inner side surface of the magnetic pole plate, the one end of the permanent magnet disposed in one end portion and/or the other end portion of the through hole, which includes one magnetic pole surface, is fitted into the recessed portion, another recessed portion is formed in the other magnetic pole surface of the permanent magnet, a protruded portion is formed on one end surface and/or the other end surface of the bar member, and said protruded portion of the bar member is fitted into said another recessed portion of the permanent magnet.

It is desired that a through hole extending in the direction of magnetization is formed in the iron core, a permanent magnet is disposed in one end of the through hole, a bar member made of a ferromagnetic material is disposed in the through hole in a region other than the region where the permanent magnet is disposed, magnetic pole plates are attached to the one end and to the other end of the iron core, a nonmagnetic region is formed between the outer peripheral surfaces of the permanent magnet and of the bar member and the inner peripheral surface of the through hole over substantially the whole region in the axial direction, a recessed portion is formed in the other magnetic pole plate, and the end of the bar member on the other side of the magnetic pole plate is fitted to the recessed portion.

It is desired that the through hole in the iron core has a large diameter portion formed at one end thereof, a nonmagnetic hollow member is fitted to the large diameter portion, the permanent magnet is fitted to the one end portion of the nonmagnetic hollow member, an end of the bar member is fitted to the other end portion of the nonmagnetic hollow member, and a cylindrical hollow portion is formed between the outer peripheral surface of the bar member of the remaining region excluding the one end portion thereof and the corresponding inner peripheral surface of the through hole.

It is desired that the one end-closed hole in the iron core has a large diameter portion formed at one end thereof, a nonmagnetic hollow member is fitted to the large diameter portion, the permanent magnet is fitted to the one end portion side of the nonmagnetic hollow member, an end of the bar member is fitted to the other end portion side of the nonmagnetic hollow member, and a cylindrical hollow portion is formed between the outer peripheral surface of the bar member of the remaining region excluding the one end portion thereof and the corresponding inner peripheral surface of the through hole.

It is desired that the amount of magnetic flux generated by the permanent magnet is nearly equal to the amount of magnetic flux generated by the coil, or the amount of the magnetic flux generated by the coil is defined to be larger, and the transverse sectional area of the iron core of a portion on which the permanent magnet is mounted is defined to be saturated with the magnetic flux of the magnetic field generated by the coil.

According to another aspect of the present invention, there is provided an eddy current retarder comprising a brake drum coupled to a rotary shaft, and a stationary magnet unit disposed on the inside of the brake drum in the radial direction, the stationary magnet unit including:

an annular base portion;

plural iron core portions extending outward in the radial direction from the outer peripheral edge of the base portion at intervals in the circumferential direction;

a support member having magnetic pole pieces arranged at the ends of the iron core portions so as to be opposed to the inner peripheral surface of the brake drum;

electromagnets formed by the iron core portions and the coils arranged to cover the outer peripheral surfaces of the iron core portions; and at least one permanent magnet buried in each of the iron core portions with the magnetic pole surface being directed in the radial direction; and an electric current being supplied to the coils to produce in the brake drum a braking force based on an eddy current generated by a magnetic field produced by the electromagnets and the corresponding permanent magnets.

It is desired that the support member is formed by laminating plural electromagnetic steel plates in the axial direction or by laminating plural blocks in the axial direction.

It is desired that the support member is formed by laminating, in the axial direction, plural electromagnetic steel plates that are divided in the circumferential direction, or by stacking, in the axial direction, plural blocks that are divided in the circumferential direction.

It is desired that the support member is formed by laminating plural electromagnetic steel plates in the axial direction, and a reinforcing plate having substantially the same shape as the electromagnetic steel plates in transverse cross section is superposed on at least the one end surface of the support member in the axial direction.

It is desired that provision is made of a stationary frame having annular support plates so disposed that the direction of thickness is in agreement with the axial direction, and the stationary magnet unit and the base portions of the reinforcing plates are superposed on the support plate portion of the stationary frame and these are fastened as a unitary structure by bolts or rivets.

It is desired that annular members formed of a good conductor such as copper, a copper alloy or the like are disposed on the inner peripheral surfaces and/or on the end surfaces of the brake drum.

According to a further aspect of the present invention, there is provided an eddy current retarder comprising a brake drum coupled to a rotary shaft and a stationary magnet unit disposed on the inside of the brake drum in the radial direction, the stationary magnet unit including:

an annular stationary support cylinder;

plural iron cores arranged on the outer peripheral edge of the stationary support cylinder at intervals in the circumferential direction;

magnetic pole plates disposed at the ends of the iron cores so as to be opposed to the inner peripheral surface of the brake drum;

electromagnets formed by the iron cores and by coils arranged so as to cover the outer peripheral surfaces of the iron cores; and at least one permanent magnet buried in each of the iron cores with the magnetic pole surface being directed in the radial direction; and an electric current being supplied to the coils to produce in the brake drum a braking force based on an eddy current generated by a magnetic field due to the electromagnets and the corresponding permanent magnets.

According to a still further aspect of the present invention, there is provided an eddy current retarder comprising a pair of brake disks coupled to a rotary shaft at a distance in the axial direction and an annular stationary magnet unit disposed between the brake disks, the stationary magnet unit including:

an annular stationary support frame;

plural iron cores arranged on the stationary support frame at intervals in the circumferential direction;

magnetic pole plates disposed at the ends of the iron cores so as to be opposed to the inner side surfaces which are opposed to each other of the brake disks;

electromagnets formed by the iron cores and by coils disposed so as to cover the outer peripheral surfaces of the iron cores; and at least one permanent magnet buried in each of the iron cores with the magnetic pole surface being directed in the radial direction; and an electric current being supplied to the coils to produce in the brake disks a braking force based on an eddy current generated by a magnetic field due to the electromagnets and the corresponding permanent magnets.

According to a yet further aspect of the present invention, there is provided an eddy current retarder comprising a stationary brake drum, an annular magnet support member that is coupled to the rotary shaft and is disposed on the inside of the stationary brake drum in the radial direction, and plural magnets disposed on the outer periphery of the magnet support member at intervals in the circumferential direction so as to be opposed to the inner peripheral surface of the stationary brake drum, said eddy current retarder further comprising:

annular members formed of a good conductor such as copper or a copper alloy coupled to the inner peripheral edges and/or to the ends in the axial direction of the stationary brake drum; and a liquid chamber disposed in the stationary brake drum for circulating the cooling liquid;

wherein the liquid chamber is partly close to, or in contact with, the annular members.

It is desired that the stationary brake drum has an inner peripheral wall opposed to the outer periphery of the magnet support member, the annular members are coupled to at least the end portions in the axial direction of the inner peripheral wall, and the end portions of the inner peripheral wall to which the annular member are coupled have a thickness smaller than the thickness of the inner peripheral wall of other portions.

It is desired that the magnet disposed on the magnet support member is constituted by:

an electromagnet which includes iron cores disposed on the outer periphery of the magnet support member at a distance in the circumferential direction, coils disposed so as to cover the outer peripheral surfaces of the iron cores, and magnetic pole pieces disposed at the ends of the iron cores so as to be opposed to the inner peripheral surface of the stationary brake drum; or a composite magnet constituted by the electromagnet and permanent magnets buried in the iron cores of the electromagnet.

It is desired that the surfaces of the peripheral edges of each magnetic pole piece of the magnet, which is opposed to the inner peripheral surface of the stationary brake drum, are so inclined that the distance between said surfaces and the inner peripheral surface of the stationary brake drum gradually increases toward the peripheral edges of the magnetic pole piece.

According to another aspect of the present invention, there is provided an eddy current retarder comprising a magnet support cylinder coupled to the rotary shaft, a stationary brake drum disposed on the inside of the magnet support cylinder in the radial direction, and plural magnets disposed on the inner periphery of the magnet support cylinder in the circumferential direction at intervals so as to be opposed to the outer peripheral surface of the stationary brake drum, said eddy current retarder further comprising:

annular members formed of a good conductor such as copper or a copper alloy coupled to the outer peripheral edges and/or to the ends in the axial direction of the stationary brake drum; and a liquid chamber disposed in the stationary brake drum for circulating the cooling liquid;

wherein the liquid chamber is partly close to, or in contact with, the annular members.

It is desired that the stationary brake drum has an outer peripheral wall opposed to the inner periphery of the magnet support cylinder, the annular members are coupled to at least the end portions in the axial direction of the outer peripheral wall, and the end portions of the outer peripheral wall to which the annular member are coupled have a thickness smaller than the thickness of the outer peripheral wall of other portions.

It is desired that the magnet disposed on the magnet support member is constituted by:

an electromagnet which includes iron cores disposed on the inner periphery of the magnet support cylinder at a distance in the circumferential direction, coils disposed so as to cover the outer peripheral surfaces of the iron cores, and magnetic pole pieces disposed at the ends of the iron cores so as to be opposed to the outer peripheral surface of the stationary brake drum; or a composite magnet constituted by the electromagnet and permanent magnets buried in the iron cores of the electromagnet.

It is desired that the surfaces of the peripheral edges of each magnetic pole piece of the magnet, which is opposed to the outer peripheral surface of the stationary brake drum, are so inclined that the distance between said surfaces and the outer peripheral surface of the stationary brake drum gradually increases toward the peripheral edges of the magnetic pole piece.

DETAILED DESCRIPTION OF THE PREFERRED EMBODIMENTS

Figure 1:
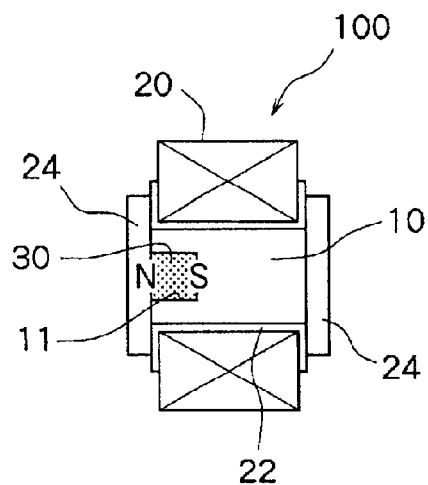
FIG. 1 is a longitudinal sectional view schematically illustrating an embodiment of a composite magnet of electromagnet and permanent magnet according to the present invention.

Preferred embodiments of the composite magnet of electromagnet and permanent magnet constituted according to the present invention will now be described in further detail with reference to the accompanying drawings. In FIGS. 1 to 20, substantially the same portions are denoted by the same reference numerals. For clear comprehension of the drawings, a hatching indicating the cross section is omitted except the portions that are to be distinguished from other portions. A composite magnet of electromagnet and permanent magnet of the invention comprises an iron core, a coil arranged to surround the outer peripheral surface of the iron core, and a permanent magnet mounted in the iron core in a manner that the magnetic pole is in agreement with the direction of magnetization of the iron core, the permanent magnet being mounted in a number of one or in a plural number in the iron core in a manner that at least the outer peripheral surfaces thereof are surrounded by the iron core. This basic constitution is common through entire embodiments given hereinafter with reference to FIGS. 1 to 20.

Figure 2:
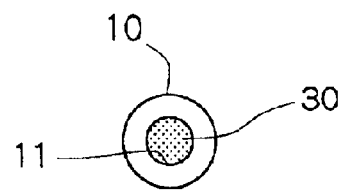
FIG. 2 is a transverse sectional view of a portion where the permanent magnet is mounted in the iron core, in the composite magnet shown in FIG. 1.

First, an embodiment of the composite magnet of electromagnet and permanent magnet of the invention will be described with reference to FIGS. 1 and 2. The composite magnet of electromagnet and permanent magnet generally designated at 100, includes an iron core 10, a coil 20 disposed at an end of the iron core 10 so as to surround the outer peripheral surface of the iron core 10, and a permanent magnet 30 mounted in the iron core 10 in a manner that the magnetic pole is in agreement with the direction of magnetization of the iron core 10. The permanent magnet 30 is mounted in a number of one inside the iron core 10 in a manner that at least the outer peripheral surfaces thereof are surrounded by the iron core 10. In the illustrated embodiment, the direction of magnetization of the iron core 10 is so specified that one end surface of the iron core 10 (left end surface in FIG. 1) is N-pole and the other end surface of the iron core 10 (right end surface in FIG. 1) is S-pole.

Described more concretely, the iron core 10 formed of a soft magnetic material such as a low-carbon iron has a circular shape in transverse cross section and is linearly extending with a nearly definite transverse sectional shape in the axial direction. Both end surfaces of the iron core 10 in the axial direction are formed to be in agreement with the planes which are at right angles with the axis thereof. A one end-closed hole 11 is formed in an end in the direction of magnetization of the iron core 10, the hole being opened at one end surface of the iron core 10 (left end surface in FIG. 1) and being closed at the other end by the wall at the back. The one end-closed hole 11 with a nearly definite circular shape in transverse cross section extends linearly in the axial direction, and is positioned on the axis common to the iron core 10. The back wall surface of the one end-closed hole 11 is formed to be in agreement with a plane that is at right angles with the axis of the iron core 10. A permanent magnet 30 is mounted in the one end-closed hole 11 of the iron core 10. For example, the Nd—Fe—B based permanent magnet 30 is so formed as to possess a circular shape in transverse cross section and to linearly extend with a nearly definite transverse sectional shape in the axial direction. The outer peripheral surface of the permanent magnet 30 has nearly the same diameter as the diameter of the inner peripheral surface of the one end-closed hole 11 in the iron core 10 so as to be fitted therein, and has a length in the axial direction which is substantially the same as the length of the one end-closed hole 11 in the iron core 10 in the axial direction. The permanent magnet 30 is fitted to the inner peripheral surface of the one end-closed hole 11 in the iron core 10 so as to be mounted in one end portion of the iron core 10. One end surface of the permanent magnet 30 (left end surface in FIG. 1) is positioned substantially in flush with one end surface of the iron core and is exposed to the outer side of the iron core 10. However, the outer peripheral surface and the other end surface (right end surface in FIG. 1) of the permanent magnet 30 are substantially intimately surrounded (covered) by the inner peripheral surface and by the back wall of the one end-closed hole 11 of the iron core 10 and hence, are not exposed to the outer side of the permanent magnet 30.

A bobbin is fitted to the outer peripheral surface of the iron core 10. The bobbin 22 formed of a nonmagnetic insulating material such as a heat-resistant synthetic resin or an insulating paper is constituted by a cylindrical portion and annular flanges formed at both ends of the cylindrical portion in the axial direction. The outer side surfaces of the annular flanges in the axial direction are so formed as to be in agreement with the planes at right angles with the axis of the bobbin 22. The coil 20 is mounted on the outer peripheral surface of the cylindrical portion between the annular flanges of the bobbin 22. The inner peripheral surface of the cylindrical portion is fitted to the outer peripheral surface of the iron core 10, so that the bobbin 22 is mounted on the iron core 10. In a state where the bobbin 22 is mounted on the iron core 10, the outer side surfaces in the axial direction of the annular flanges, i.e., both end surfaces of the bobbin 22 in the axial direction are positioned on the planes at right angles with the axis, and are substantially in common to both end surfaces of the iron core 10 (the lengths of the bobbin 2 and of the iron core 10 in the axial direction and the shapes of their both end surfaces are defined as described above). Magnetic pole plates 24 having the shape of a disk are attached to the iron core 10 to cover at least the inner portions in the radial direction of both end surfaces of the iron core 10 in the axial direction and of the outer side surfaces of the annular flanges of the bobbin 22 in the axial direction. For example, the magnetic pole plates 24 formed of a soft magnetic material such as a low-carbon iron are detachably attached to the corresponding end surfaces of the iron core 10 by using plural bolts which are not shown. One inner side surface of the magnetic pole plate 24 is attached nearly intimately to one end surface of the iron core 10, to one end surface of the permanent magnet 30 and to the outer side surface in the axial direction of one annular flange of the bobbin 22. The inner side surface of the other magnetic pole plate 24 is attached nearly intimately to the other end surface of the iron core 10 and to the outer side surface in the axial direction of the other annular flange of the bobbin 22. The magnetic pole plates 24 are formed in the shape of a disk in this embodiment, but may be formed in any other shape such as rectangular shape, polygonal shape or the like. To prevent the infiltration of water or dust into the permanent magnet 30, it is desired to seal the permanent magnet 30 by applying a sealing member such as a sealer between the inner side surface of one magnetic pole plate 24 and one end surface of the iron core 10, one end surface of the permanent magnet 30 and outer side surface in the axial direction of one annular flange of the bobbin 22. According to another embodiment, the bobbin 22 may be formed by a nonmagnetic material which is coated onto the outer peripheral surface of the iron core 10, followed by curing to obtain an insulating property.

In the thus constituted composite magnet 100, the permanent magnet 30 is mounted on the iron core 10 in a state of not being magnetized. To magnetize the permanent magnet 30 in a state where the permanent magnet 30 which has not yet been magnetized is mounted on the iron core 10 as part of the component magnet 100, a magnetizing force is applied to the outer side surfaces of the magnetic pole plates 24 (a current of a magnetizing yoke is supplied to an exciting coil) to magnetize the permanent magnet 30 and, at the same time, a large current is supplied to the coil 20 so that a portion of the iron core 10 surrounding the permanent magnet 30 is magnetically saturated or nearly magnetically saturated. As a result, since the portion of the iron core 10 surrounding the permanent magnet 30 is magnetically saturated or nearly magnetically saturated, the magnetic flux flowing through the iron core 10 due to the magnetizing force applied for magnetizing the permanent magnet 30 almost all passes through the permanent magnet 30 in the portion of the permanent magnet 30, so that the permanent magnet 30 is magnetized as desired. This stems from the above-mentioned constitution in which the permanent magnet 30 is mounted inside the iron core 10 in a manner that the outer peripheral surfaces of the permanent magnet 30 are surrounded by the iron core 10. At this moment, application of the magnetizing force for magnetizing the permanent magnet 30 and supply of the current to the coil 20 are made only in the winking of an eye (e.g., 2 to 3 msec).

In the above composite magnet 100, the direction of magnetization of the iron core 10 has been so specified that the one end surface of the iron core 10 (left end surface in FIG. 1) i.e., one of the magnetic pole plate 24 (left magnetic pole plate 24 in FIG. 1), becomes the N-pole, and the other magnetic pole plate 24 (right magnetic pole plate 24 in FIG.

Figure 3:
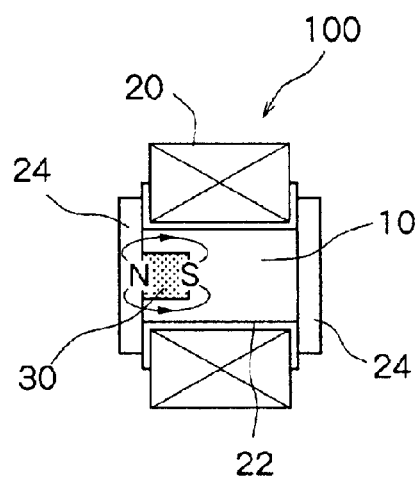
FIG. 3 is a diagram schematically illustrating the state of a magnetic flux of when no electric current is supplied to the coil, in the composite magnet of FIG. 1, and is a longitudinal sectional view like FIG. 1.
Figure 4:
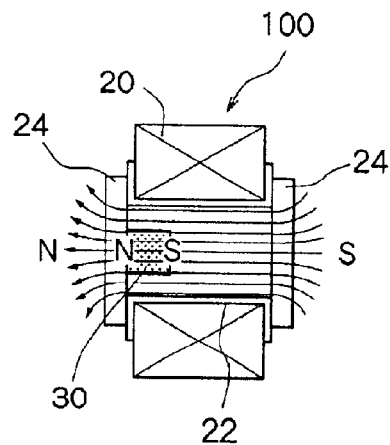
FIG. 4 is a diagram schematically illustrating the state of a magnetic flux of when an electric current is supplied to the coil, in the composite magnet of FIG. 1, and is a longitudinal sectional view like FIG. 1.

1) becomes the S-pole. Therefore, one end surface of the permanent magnet 30 (left end surface in FIG. 1) is magnetized to the N-pole, and the other end surface (right end surface in FIG. 1) is magnetized to the S-pole. FIG. 3 schematically illustrates the lines of magnetic flux in a state where no current is supplied to the coil 20. The magnetic flux of the permanent magnet 30 flows through one magnetic pole plate 24 and a loop-like magnetic circuit formed in the iron core 10, and is substantially prevented from leaking to the outer side. FIG. 4 schematically illustrates the lines of magnetic flux in a state where a current is supplied to the coil 20 of the composite magnet 100. When the current is supplied to the coil 20, the iron core 10 is magnetized in a manner that the one end surface of the iron core 10 (i.e., one magnetic pole plate 24) assumes the N-pole and the other end surface of the iron core 10 (i.e., other magnetic pole plate 24) assumes the S-pole. As a result, a magnetic field of a composite of the magnetic flux generated in the iron core 10 and the magnetic flux of the permanent magnet 30, is formed in the composite magnet 100.

In the above composite magnet 100, it is desired to effectively use both of the electromagnet (chiefly, iron core 10 and the coil 20) and the permanent magnet 30. For this purpose, it is desired to maintain an optimum balance between the magnetic flux of the permanent magnet 30 and the magnetic flux generated by the iron core 10 by flowing a current to the coil 20. To optimize the balance, the magnetic flux generated in the iron core 10 must be defined to be equal to, or larger than, the magnetic flux of the permanent magnet 30. In other words, the magnetic flux of the permanent magnet 30 must be defined to be equal to, or smaller than, the magnetic flux generated in the iron core 10. When the magnetic flux of the permanent magnet 30 is too large, the magnetic flux in the permanent magnet 30 is magnetically short-circuited in the iron core 10 despite the iron core 10 is magnetized by supplying a current to the coil 20; i.e., the magnetic flux of the permanent magnet 30 cannot be effectively used. Further, when the portion of the iron core 10 surrounding the outer peripheral surfaces of the permanent magnet 30 has a transverse sectional area which is too small, the magnetic flux of the permanent magnet 30 leaks to the outside of the composite magnet 100 in a state where no current is supplied to the coil 20. It is desired that the portion of the iron core 10 surrounding the outer peripheral surfaces of the permanent magnet 30 has such a transverse sectional area that the above portion of the iron core is saturated or nearly saturated with the magnetic flux of the permanent magnet 30 in a state where no current is supplied to the coil 20. It is further desired that the sectional area is so defined that the above portion is saturated with the magnetic flux due to the magnetic flux generated by the coil 20 in a state where the current is supplied to the coil 20.

In the composite magnet 100 from the above-mentioned point of view, when the saturation flux density of the iron core 10 is nearly equal to the flux density of the permanent magnet 30, the transverse sectional area of the permanent magnet 30 is defined to be nearly equal to the transverse sectional area of the iron core 10 of the portion where the permanent magnet 30 is mounted within the range that it does not exceed the transverse sectional area of the iron core 10 of the portion where the permanent magnet 30 is mounted. In other words, when the total transverse sectional area of the permanent magnet 30 and the iron core 10 of the portion where the permanent magnet 30 is mounted is taken as 1, then, the transverse sectional area of the permanent magnet 30 is nearly ½ and the transverse sectional area of the iron core 10 of the portion where the permanent magnet 30 is mounted is nearly ½ (the transverse sectional area of the permanent magnet 30 shall not exceed the transverse sectional area of the iron core 10). In a state where the iron core 10 is magnetized by supplying a current to the coil 20 in the above constitution, if the magnetic flux generated from one magnetic pole surface of the composite magnet 100 (one end surface of the iron core 10 inclusive of one end surface of the permanent magnet 30, i.e., outer surface of one magnetic pole plate 24) is taken as 1, nearly ½ of the magnetic flux is the one generated by the permanent magnet 30 having the transverse sectional area of nearly ½ and another nearly ½ of the magnetic flux is the one generated by the iron core 10 having the transverse sectional area of nearly ½. As a result, the above composite magnet 100 allows to effectively utilize both of the electromagnet (chiefly, the iron core 10 and the coil 20) and the permanent magnet 30. When the saturation flux density of the iron core 10 is larger than the flux density of the permanent magnet 30, the transverse sectional area of the iron core 10 of the portion where the permanent magnet 30 is mounted must be decreased so that, when no current is supplied to the coil 20, the above portion is saturated with the magnetic flux of the permanent magnet 30. In either case, it is desired that the amount of magnetic flux generated by the permanent magnet 30 is defined to be nearly equal to the amount of magnetic flux generated by the coil 20, or the amount of the magnetic flux generated by the coil 20 is defined to be larger. It is further desired that the transverse sectional area of the iron core 10 of the portion surrounding the outer peripheral surfaces of the permanent magnet 30 is so defined that this portion is saturated or nearly saturated with the magnetic flux of the permanent magnet 30 in a state where no current is supplied to the coil 20. It is further desired that the area of the above portion is so defined that the portion is saturated with the magnetic flux due to the magnetic flux generated by the coil 20 in a state where a current is supplied to the coil 20. Namely, according to the present invention, there is obtained the composite magnet 100 which is highly efficient and of reduced waste. Further, when the magnetic flux generated from one magnetic pole surface of the composite magnet 100 is defined to be equal to that of the prior art, then, the number of turns of the coil 20 can be nearly halved compared to that of the prior art and, hence, the length of the electromagnet in the direction of magnetization (lengths of the iron core 10 and the coil 20 in the direction of magnetization or in the axial direction) can be nearly halved compared to that of the prior art, making it possible to realize the composite magnet 100 in a compact constitution as a whole, in a decreased weight and at a decreased cost. An amount of electric current supplied to the coil 20 also decreases, as a matter of course.

In the above composite magnet 100, the permanent magnet 30 is mounted inside the iron core 10 in a manner that at least the outer peripheral surfaces thereof (outer peripheral surfaces and other end surface in the illustrated embodiment) are surrounded by the iron core 10. When the iron core 10 is magnetized by supplying a current to the coil 20, therefore, the magnetic flux formed in the iron core 10 can be efficiently collected to a sufficient degree in the N-pole which is one of the magnetic pole surfaces of the iron core 10. That is, the permanent magnet 30 is mounted inside the iron core 10 in a manner that the outer peripheral surfaces thereof are surrounded by the iron core 10 and, hence, a magnetic passage is continuously formed on the outer periphery of the iron core 10 from one end till the other end thereof in the direction of magnetization. Accordingly, substantially all of the magnetic flux formed on the outer periphery of the iron core 10 can be efficiently guided as desired up to the N-pole which is one magnetic pole surface of the iron core 10. Further, the outer periphery of the iron core 10 is located at a predetermined position relative to the coil 20 in nearly the radial direction, from one end of the iron core 10 to the other end thereof in the direction of magnetization, making it possible to effectively generate the magnetic flux corresponding to the current supplied to the coil 20. When the current is supplied to the coil 20 to magnetize the iron core 10, therefore, the iron core 10 generates the magnetic flux very efficiently, and the performance of the electromagnet is utilized to a sufficient degree. Further, since the permanent magnet 30 is mounted in the iron core 10 in a manner that the outer peripheral surfaces thereof are surrounded by the iron core 10, the transverse sectional area of the permanent magnet 30 can be increased to a sufficient degree as desired as described earlier, and the permanent magnet 30 can be effectively utilized. According to the present invention, therefore, both the electromagnet and the permanent magnet 30 can be effectively utilized.

According to the present invention, the permanent magnet 30 is mounted in the iron core 10 in a manner that the outer peripheral surfaces thereof are surrounded by the iron core 10, making it possible to increase the transverse sectional area of the permanent magnet 30 to a considerably larger area than that of the prior art. Due to the constitutions that the permanent magnet 30 is mounted in the iron core 10 in a manner that the outer peripheral surfaces thereof are surrounded by the iron core 10 and that the permanent magnet 30 has a transverse sectional area which is considerably larger than that of the prior art, the permanent magnet 30 can be sufficiently magnetized as desired even by applying the magnetizing force for magnetization after the permanent magnet 30 before magnetized has been assembled in the iron core 10, facilitating the operation for assembling the permanent magnet 30 into the iron core 10. Due to the constitution that the permanent magnet 30 is mounted in the iron core 10 in a manner that the outer peripheral surfaces thereof are surrounded by the iron core 10, the permanent magnet 30 can have a simple shape such as a circular shape or a rectangular shape in transverse cross section. Besides, unlike that of the prior art, no groove machining needs be performed in the outer periphery of the iron core 10, and a one end-closed hole 11 can be easily formed by cutting in one end surface of the iron core 10, making it possible to lower the cost of producing the composite magnet 100. In the above composite magnet 100, further, the length of the permanent magnet 30 can be relatively shortened, eliminating the waste of the material and decreasing the cost of the material (cost of the material of the permanent magnet 30). When the Nd—Fe—B based permanent magnet having a strong magnetic force is employed as the permanent magnet 30, the length of the iron core in the axial direction and the size thereof as a whole can be greatly decreased compared to those of the prior art and hence, the composite magnet 100 as a whole can be constituted in a very compact size compared to that of the prior art.

In the above embodiment, the iron core 10, bobbin 22, one end-closed hole 11 and permanent magnet 30 are respectively formed in a circular shape in transverse cross section, and the permanent magnet 30 is fitted into the one end-closed hole 11 formed on the axis common to the iron core 10. According to another embodiment, the one end-closed hole 11 is formed in the iron core 10 at a position slightly deviated from the axis thereof and the permanent magnet 30 is fitted into this one end-closed hole 11. There can be proposed a further embodiment in which the transverse sectional shapes of the iron core 10, bobbin 22, one end-closed hole 11 and permanent magnet 30 are not limited to circular shapes but are formed in nearly rectangular shapes (desirably, corner portions are circularly chamfered), a still further embodiment of a combination of a rectangular shape and a circular shape, and a yet further embodiment of a combination of other shapes. In any way, it is preferable that the device is produced easily and has a compact size, but the composite magnet must be used therefor. The shape will be set according to the mounting space in a device and equipment that are not shown. The same holds concerning the shapes of the magnetic pole plates 24. Further, it needs not be pointed out that the transverse sectional shape of the coil 20 as a whole is suitably set to meet the shape of the bobbin 22 in transverse cross section. The above-mentioned possibility of modifications also exists even in the constituent members of the composite magnet 100 of other embodiments that will be described later.

In the above-mentioned embodiment, the permanent magnet 30 in a number of one is mounted on one end of the iron core 10. There can be further proposed an embodiment (not shown) in which the permanent magnet is mounted on the other end. In this embodiment, the one end-closed hole 11 same as that shown in FIGS. 1 and 2 is formed in the other end of the iron core 10, and the permanent magnet 30 is fitted into this one end-closed hole 11. There can be further proposed an embodiment (see FIG. 5) in which one permanent magnet 30 is mounted in one end of the iron core 10 and another permanent magnet 30 is mounted in the other end thereof (a total of two permanent magnets are mounted) in the same manner. In this embodiment, the one end-closed hole 11 same as the one shown in FIGS. 1 and 2 is formed in both one end and the other end of the iron core 10, and the permanent magnets 30 are fitted into these one end-closed holes 11. In the embodiment shown in FIG. 5, the permanent magnets 30 are arranged in line with the direction of magnetization of the iron core 10, so that the left end surface is the N-pole and the right end surface is the S-pole in FIG. 5. Due to an increase in the number of the permanent magnets 30 by one, this composite magnet can produce more strong magnetic force than the composite magnet 100 illustrated with reference to FIGS. 1 to 4.

Figure 6:
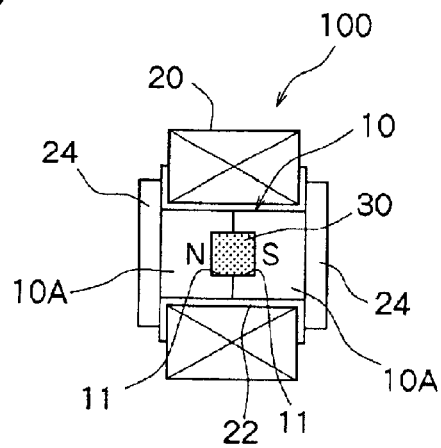
FIG. 6 is a longitudinal sectional view schematically illustrating a further embodiment of the composite magnet of electromagnet and permanent magnet according to the present invention.

FIG. 6 illustrates a further embodiment of the composite magnet 100. In the composite magnet 100 shown in FIG. 6, the iron core 10 is divided into two iron cores 10A along the transverse cross section at an intermediate portion in the direction of magnetization. The permanent magnet 30 is mounted across the ends, opposing to each other, of the iron cores 10A. More concretely, the one end-closed hole 11 same as that of the previously-mentioned embodiments is formed in the opposing ends of the iron cores 10A, and the permanent magnet 30 is inserted substantially intimately in the one end-closed holes 11 in the iron cores 10A. The other ends of the iron cores 10A are covered with the magnetic pole plates 24 in the same manner as the embodiment shown in FIG. 1. Though not illustrated, the iron cores 10A are fastened together with the magnetic pole plates 24 by using plural bolts that are not shown. Since the permanent magnet 30 is disposed in the intermediate portion of the iron core 10 in the direction of magnetization, the dust and water infiltrate less into the composite magnet 100 than that of the previously-mentioned embodiments. Accordingly, the permanent magnet 30 is sealed more reliably sealed and exhibits a further extended life. Further, the magnetic force of the permanent magnet 30 is balanced in the axial direction of the iron cores 10A.

Figure 7:
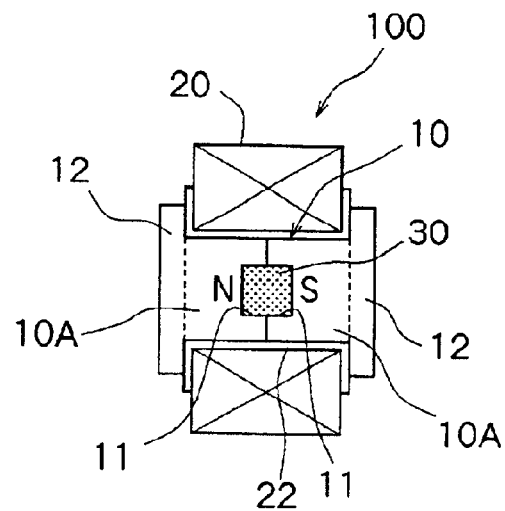
FIG. 7 is a longitudinal sectional view schematically illustrating a still further embodiment of the composite magnet of electromagnet and permanent magnet according to the present invention.

FIG. 7 illustrates a further embodiment of the composite magnet 100. In the composite magnet 100 shown in FIG. 7, the iron core 10 is divided into two iron cores 10A along the transverse cross section at an intermediate portion in the direction of magnetization, and the permanent magnet 30 is mounted across the ends opposing to each other, of the iron cores 10A. This constitution is substantially the same as the embodiment shown in FIG. 6, but the magnetic pole portions 12 are formed, integratedly with the other ends of the iron cores 10A, so as to extend outward in the radial direction. The constitution of the magnetic pole portions 12 is substantially the same as the magnetic pole plates 24 except that they are integrated with the other ends of the corresponding iron cores 10a. Though not illustrated, the iron cores 10A are fastened together by using plural bolts that are not shown. In this embodiment, the magnetic pole portions 12 are integrated with the other ends of the corresponding iron cores 10A. Therefore, the number of parts is decreased compared to that of the embodiment shown in FIG. 6, and the assembling operation is carried out more simply.

Figure 5:
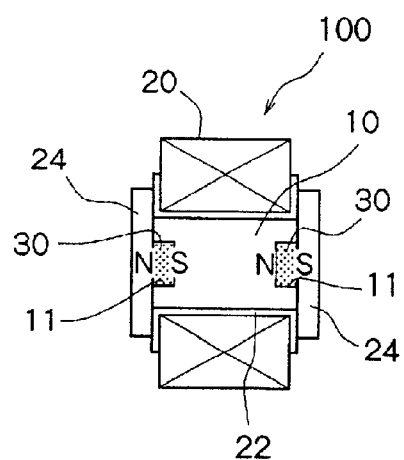
FIG. 5 is a longitudinal sectional view schematically illustrating another embodiment of the composite magnet of electromagnet and permanent magnet according to the present invention.

In the composite magnet 100 shown in FIGS. 5, 6 and 7, basic constitutions other than those described above are substantially the same as those of the composite magnet 100 described with reference to FIGS. 1 to 4 and, hence, exhibit substantially the same action and effect as those of the composite magnet 100 described with reference to FIGS. 1 to 4, as a matter of course.

Figure 8:
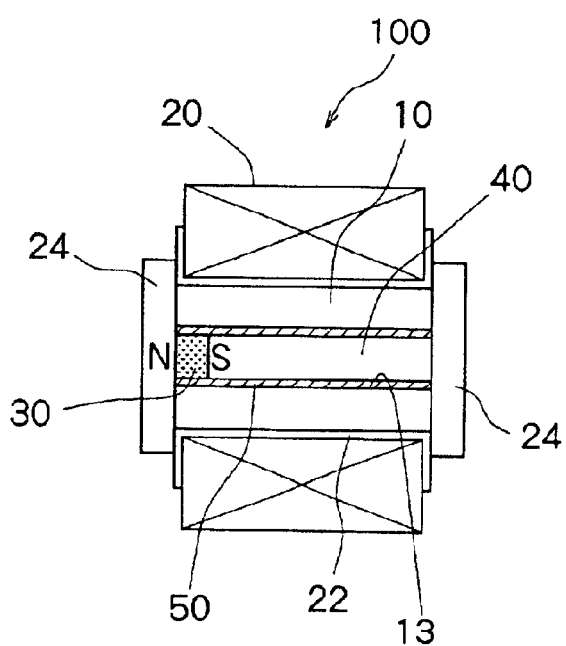
FIG. 8 is a longitudinal sectional view schematically illustrating a yet further embodiment of the composite magnet of electromagnet and permanent magnet according to the present invention.

FIG. 8 illustrates a still further embodiment of the composite magnet 100. In the composite magnet 100 shown in FIG. 8, a through hole 13 is formed in the iron core 10 extending in the direction of magnetization. The through hole 13 having a circular inner peripheral surface is formed in concentric with the axis common to the iron core 10. The permanent magnet 30 is disposed in one end of the through hole 13 (left end in FIG. 8). A bar member 40 is disposed in the through hole 13 in a region other than the region where the permanent magnet 30 is disposed. The bar member 40 formed of a ferromagnetic material such as a low-carbon steel has a circular outer peripheral surface, and both end surfaces of the bar member 40 in the axial direction are formed to be in agreement with the planes at right angles with the axis. The diameter of the bar member 40 is substantially the same as the diameter of the permanent magnet 30 but is smaller than the inner diameter of the through hole 13. One end of the permanent magnet 30 is substantially in flush with the one end surface of the iron core 10, and the other end surface of the permanent magnet 30 is substantially intimately contacted to one end surface of the bar member 40, and the other end surface of the bar member 40 is positioned substantially in flush with the other end surface of the iron core 10. The magnetic pole plates 24 are attached to one end and to the other end of the iron core 10 in the same manner as the embodiments described above with reference to FIGS. 1 to 4. A gap of a cylindrical shape, i.e., a nonmagnetic region, is formed between the outer peripheral surfaces of the permanent magnet 30 and of the bar member 40 and the inner peripheral surface of the through hole 13 over substantially the whole region in the axial direction. A nonmagnetic hollow member 50 (cylindrical member 50) is inserted substantially intimately in the nonmagnetic region of the cylindrical shape. The nonmagnetic hollow member 50 is formed of a nonmagnetic material such as aluminum, an austenite-based stainless steel or a heat-resistant synthetic resin.

Figure 9:
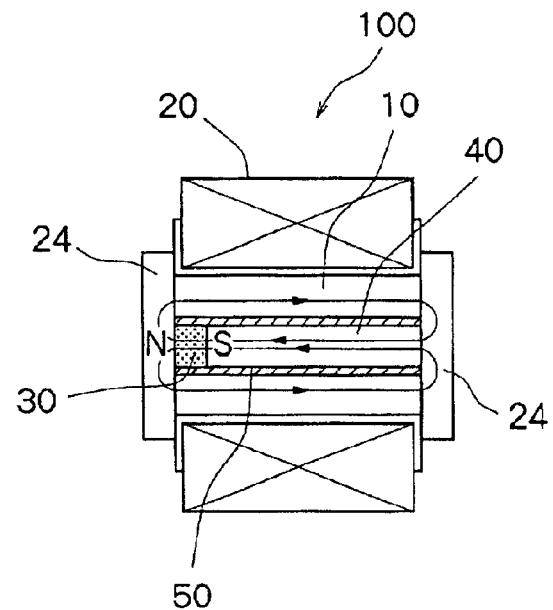
FIG. 9 is a diagram illustrating the state of a magnetic flux of when no electric current is supplied to the coil, in the composite magnet of FIG. 8, and is a schematic longitudinal sectional view like FIG. 8.
Figure 10:
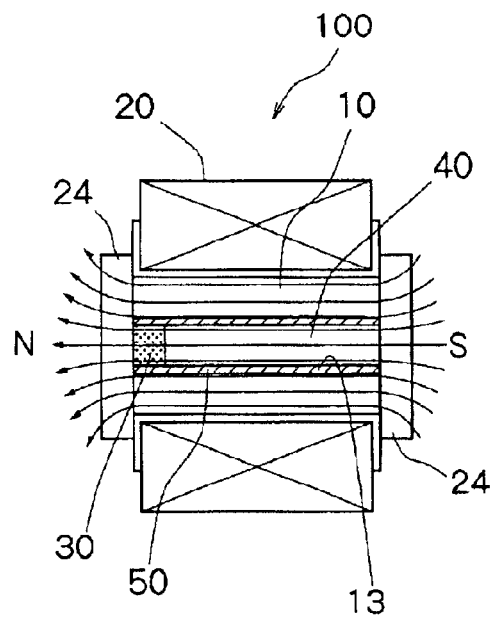
FIG. 10 is a diagram illustrating the state of a magnetic flux of when an electric current is supplied to the coil, in the composite magnet of FIG. 8, and is a schematic longitudinal sectional view like FIG. 8.

FIG. 9 schematically illustrates the lines of magnetic flux of the composite magnet 100 shown in FIG. 8 in a state where no current is supplied to the coil 20. The magnetic flux of the permanent magnet 30 flows through one magnetic pole plate 24, iron core 10, other magnetic pole plate 24 and a loop-like magnetic circuit formed in the bar member 40, and is substantially prevented from leaking to the outer side. FIG. 10 schematically illustrates the lines of magnetic flux of the composite magnet 100 shown in FIG. 8 in a state where a current is supplied to the coil 20. When the current is supplied to the coil 20, the one end surface of the iron core 10 (i.e., one magnetic pole plate 24) assumes the N-pole and the other end surface of the iron core 10 (i.e., the other magnetic pole plate 24) assumes the S-pole. As a result, there is formed a magnetic field of a composite of the magnetic flux generated by the iron core 10 and the magnetic flux of the permanent magnet 30. In the composite magnet 100 shown in FIG. 8 as will be easily comprehended from the foregoing description, the magnetic flux of the permanent magnet 30 flows through nearly the whole regions of the iron core 10 and the bar member 40 present inside the coil 20 (see FIG. 9) in a state where no current is supplied to the coil 20. When the current is supplied to the coil 20, therefore, the magnetic flux is easily affected by the magnetic flux generated by the coil 20. Even when the permanent magnet 30 having a relatively short length is used, therefore, the magnetic flux of the permanent magnet 30 is effectively utilized without being short-circuited. In this embodiment, therefore, it is allowed to use a Nd—Fe—B based permanent magnet 30 having particularly excellent magnetic characteristics and having a relatively short length and hence, a maximum effect can be exhibited while saving the cost of the material, which is advantageous in practice. Other basic constitutions of the composite magnet 100 shown in FIG. 8 are substantially the same as those of the composite magnet 100 described with reference to FIGS. 1 to 4 and, hence, exhibit substantially the same action and effect as those of the composite magnet 100 described with reference to FIGS. 1 to 4.

In the composite magnet 100 shown in FIG. 8, a nonmagnetic region of a cylindrical shape is formed between the outer peripheral surfaces of the permanent magnet 30 and of the bar member 40 and the inner peripheral surface of the through hole 13 over substantially the whole region in the axial direction, and a nonmagnetic hollow member 50 is inserted in the nonmagnetic region over the whole region in the axial direction. In other words, the nonmagnetic region is formed by the nonmagnetic hollow member 50 inserted in the whole region in the axial direction. In place of this embodiment, however, there can also be proposed an embodiment (nonmagnetic hollow member 50 is not inserted) in which the nonmagnetic region is formed in only the cylindrical hollow portion (i.e., cylindrical air gap) formed over the whole region in the axial direction. In this embodiment, contrivance is necessary for stably holding the permanent magnet 30 and the bar member 40 as will be specifically described later with reference to FIG. 17. In the embodiment of the composite magnet 100 shown in FIG. 8, the permanent magnet 30 is mounted in a number of one on an end portion of the iron core 10. However, there can also be proposed an embodiment (not shown) in which the permanent magnet 30 is similarly mounted in a number of one on the other end portion thereof.

FIGS. 11 to 20 illustrate further embodiments of the composite magnet 100 shown in FIG. 8. The basic constitutions of these embodiments are substantially the same as those of the composite magnet 100 shown in FIG. 8 and, hence, substantially the same action and effect are obtained. Embodiments of the composite magnet 100 will be described in order of the drawings.

Figure 11:
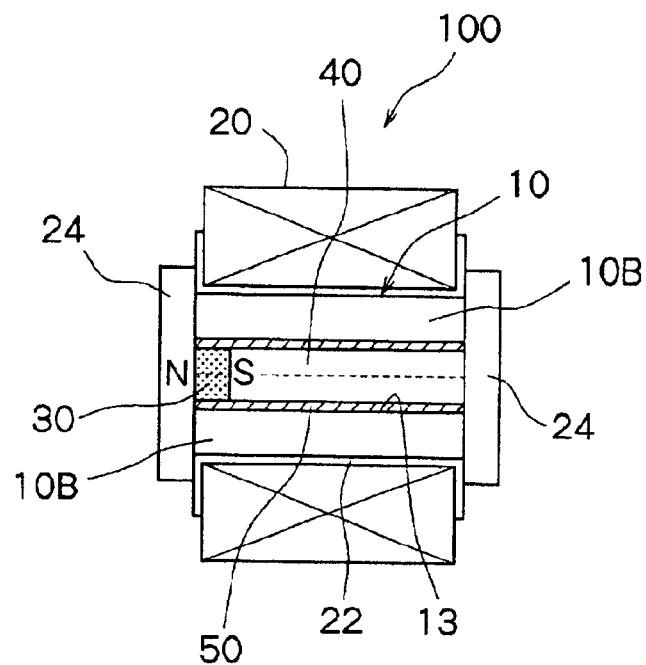
FIG. 11 is a longitudinal sectional view schematically illustrating another embodiment of the composite magnet of electromagnet and permanent magnet according to the present invention.
Figure 12:
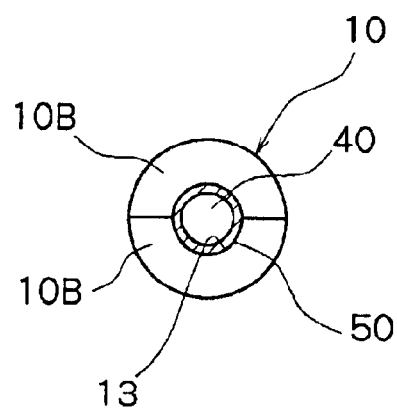
FIG. 12 is a transverse sectional view of a portion where a nonmagnetic hollow member is mounted in the iron core, in the composite magnet shown in FIG. 11.

FIGS. 11 and 12 illustrate a further embodiment of the composite magnet 100. In the composite magnet 100 shown in FIG. 11, the iron core 10 of the component magnet 100 of FIG. 8 is divided into two iron cores 10B which are substantially the same parts on a plane passing through the axis and extending along the axis. According to this constitution, the nonmagnetic hollow member 50 and the iron core 10 can be more easily assembled than the composite magnet 100 shown in FIG. 8. In other respects, the constitution is substantially the same as the composite magnet 100 shown in FIG. 8.

Figure 13:
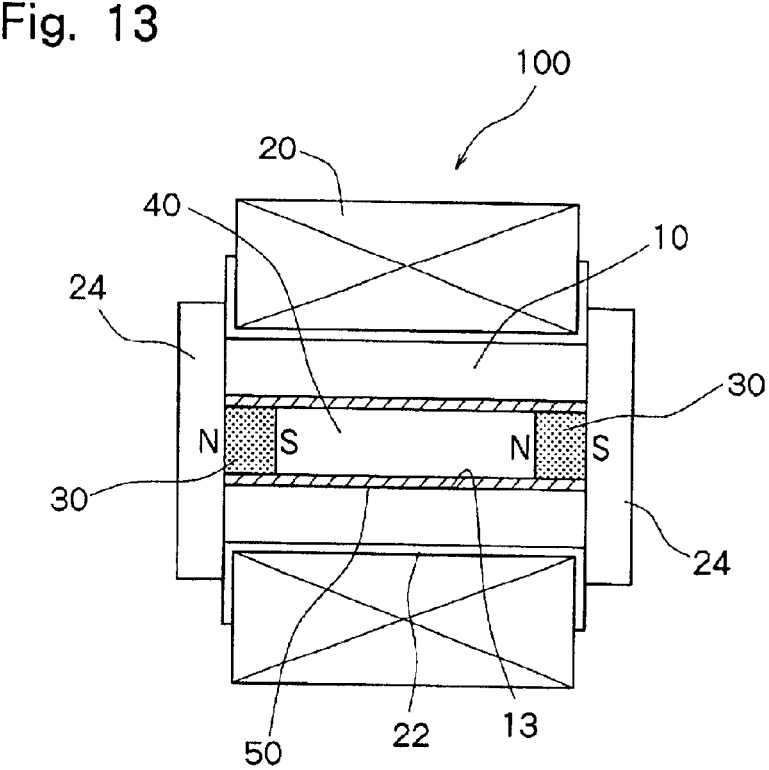
FIG. 13 is a longitudinal sectional view schematically illustrating a further embodiment of the composite magnet of electromagnet and permanent magnet according to the present invention.

FIG. 13 illustrates a still further embodiment of the composite magnet 100. In the composite magnet 100 shown in FIG. 13, permanent magnets 30 are mounted in both ends of the iron core 10 of the composite magnet 100 of FIG. 8. This constitution produces more strong magnetic force compared to the composite magnet 100 shown in FIG. 8. In other respects, the constitution is substantially the same as that of the composite magnet 100 shown in FIG. 8.

Figure 14:
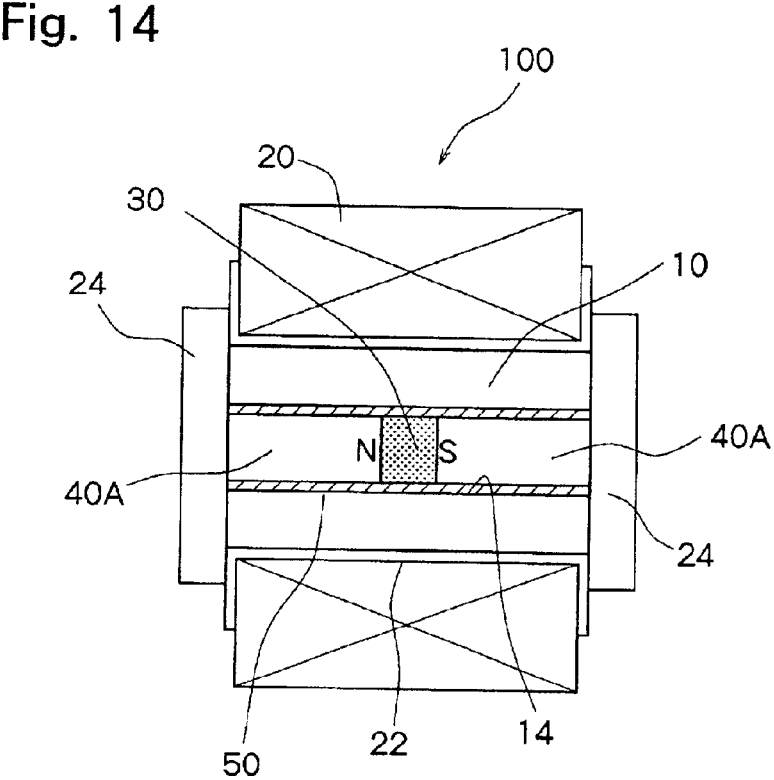
FIG. 14 is a longitudinal sectional view schematically illustrating a further embodiment of the composite magnet of electromagnet and permanent magnet according to the present invention.

FIG. 14 illustrates a yet further embodiment of the composite magnet 100. In the composite magnet 100 shown in FIG. 14, a permanent magnet 30 is mounted in the intermediate portion of the iron core 10 of FIG. 8 in the axial direction. Therefore, the bar member 40 fitted in the nonmagnetic hollow member 50 is divided into two bar members 40A which are substantially the same parts. According to this constitution, the permanent magnet 30 is disposed in the intermediate portion of the permanent magnet 30 in the axial direction of the nonmagnetic hollow member 50. Therefore, dust and water hardly infiltrate compared with the composite magnet 100 shown in FIG. 8. Accordingly, the permanent magnet 30 is more reliably sealed and exhibits further extended life. Besides, the magnetic force of the permanent magnet 30 is favorably balanced in the axial direction of the bar members 40A. In other respects, the constitution is substantially the same as that of the composite magnet 100 shown in FIG. 8.

Figure 15:
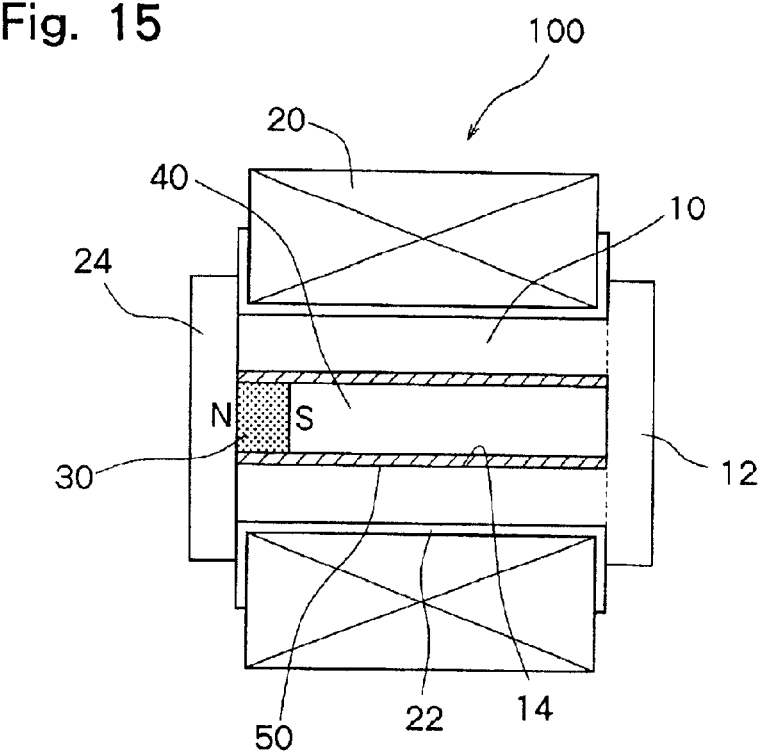
FIG. 15 is a longitudinal sectional view schematically illustrating a still further embodiment of the composite magnet of electromagnet and permanent magnet according to the present invention.

FIG. 15 illustrates a further embodiment of the composite magnet 100. In the composite magnet 100 shown in FIG. 15, the magnetic pole plate 24 attached to the other end of the iron core 10 of the composite magnet 100 of FIG. 8 is integrated with the iron core 10 to constitute a magnetic pole portion 12. Therefore, in the iron core 10 is formed a one end-closed hole 14 which extends in the axial direction and of which one end is opened at one end of the iron core 10 and of which the other end is closed. The one end-closed hole having a circular inner peripheral surface is formed in concentric with an axis common to the iron core 10 and extends from the one end to the other end of the iron core 10 (extends up to the other end closed by the magnetic pole portion 12 that is formed as a unitary structure). The permanent magnet 30 is disposed in an open end of the one end-closed hole 14, and a bar member 40 made of a ferromagnetic material is disposed in the one end-closed hole 14 in a region other than the region where the permanent magnet 30 is disposed. A magnetic pole plate 24 is attached to an open end side of the iron core 10. A cylindrical gap, i.e., nonmagnetic region is formed between the outer peripheral surfaces of the permanent magnet 30 and of the bar member 40 and the inner peripheral surface of the one end-closed hole 15 over substantially the whole region in the axial direction. A nonmagnetic hollow member 50 (cylindrical member 50) is substantially intimately inserted in the cylindrical nonmagnetic region. According to this constitution, as one magnetic pole plate 24 is not required, the number of parts is decreased compared to the composite magnet 100 shown in FIG. 8, and improved sealing is accomplished for the nonmagnetic hollow member 50 and for the bar member 40. In other respects, the constitution is substantially the same as that of the composite magnet 100 shown in FIG. 8.

Figure 16:
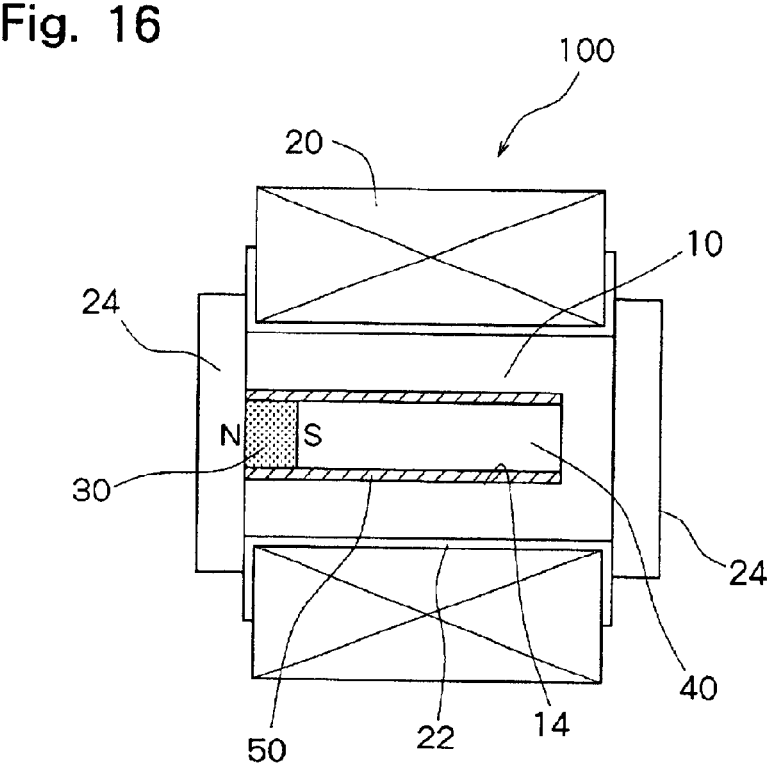
FIG. 16 is a longitudinal sectional view schematically illustrating a yet further embodiment of the composite magnet of electromagnet and permanent magnet according to the present invention.

FIG. 16 illustrates a further embodiment of the composite magnet 100. In the composite magnet 100 shown in FIG. 16, a one end-closed hole 14 is formed in the iron core 10 extending in the axial direction, the one end thereof being opened at an end of the iron core 10 and the other end thereof being closed. The one end-closed hole 14 having a circular inner peripheral surface extends from one end to the other end of the iron core 10. In the composite magnet 100 shown in FIG. 15, the one end-closed hole 14 extends from one end to the other end, whereas in the composite magnet 100 shown in FIG. 16, the one end-closed hole 14 is formed a bit short. Magnetic pole plates 24 are attached to the one end and to the other end of the iron core 10. In other respects, the constitution is substantially the same as that of the composite magnet 100 shown in FIG. 15. According to this constitution, improved sealing is accomplished for the nonmagnetic hollow member 50 and for the bar member 40 like in the composite magnet 100 shown in FIG. 8.

Figure 17:
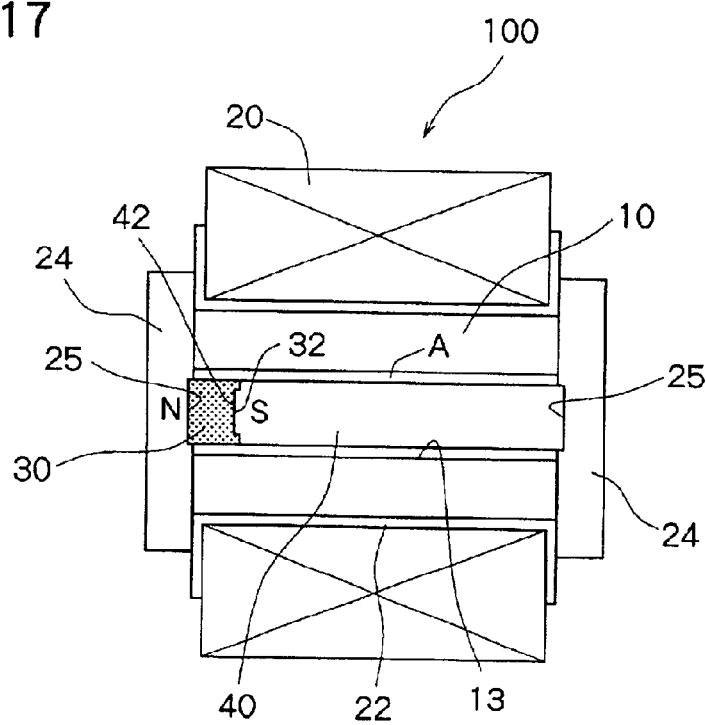
FIG. 17 is a longitudinal sectional view schematically illustrating a further embodiment of the composite magnet of electromagnet and permanent magnet according to the present invention.

FIG. 17 illustrates a yet further embodiment of the composite magnet 100. In the composite magnet 100 shown in FIG. 17, a recessed portion 25 is formed in the inner side surfaces of the one and other magnetic pole plates 24. The recessed portions 25 have a circular shape in transverse cross section and a predetermined depth in the axial direction. The recessed portions 25 are in line with the axis common to the through hole 13 and have diameters nearly equal to the diameters of the permanent magnet 30 and of the bar member 40, but are formed to be smaller than the diameter of the through hole 13. The permanent magnet 30 is disposed in one end of the through hole 13. One end of the permanent magnet 30 inclusive of one magnetic pole surface and disposed in one end of the through hole 13 is fitted nearly intimately to the recessed portion 25 of the one magnetic pole plate 24. A recessed portion 32 is formed in the other magnetic pole surface of the permanent magnet 30. The recessed portion 32 positioned in line with the axis common to the permanent magnet 30 has a circular shape in transverse cross section and a predetermined depth in the axial direction. A protruded portion 42 is formed on one end surface of the bar member 40 to protrude outward in the axial direction. The protruded portion 42 of the bar member 40 positioned in line with the axis common to the bar member 40 has a circular shape in transverse cross section and has a predetermined height in the axial direction. The protruded portion 42 has a diameter nearly equal to the inner diameter of the recessed portion 32 of the permanent magnet 30. Further, the height of the protruded portion 42 in the axial direction is nearly equal to the depth of the recessed portion 32 of the permanent magnet 30 in the axial direction. The protruded portion 42 of the bar member 40 is fitted nearly intimately into the recessed portion 32 of the permanent magnet 30, and the other end of the bar member is fitted nearly intimately to the recessed portion 25 of the other magnetic pole plate 24. A cylindrical hollow portion, i.e., a nonmagnetic region A is formed between the outer peripheral surfaces of the permanent magnet 30 and of the bar member 40 and the inner peripheral surface of the through hole 13 over substantially the whole region in the axial direction. The nonmagnetic region A is formed by only a gap of a cylindrical shape, i.e., formed by only an air gap of the cylindrical shape.

The composite magnet 100 shown in FIG. 17 has, as described above, the constitution that an end of the permanent magnet 30 is fitted to the recessed portion 25 of one magnetic pole plate 24, the protruded portion 42 at an end of the bar member 40 is fitted to the recessed portion 32 of the other magnetic pole surface of the permanent magnet 30, and the other end of the bar member 40 is fitted to the recessed portion 25 of the other magnetic pole plate 24. Accordingly, the permanent magnet 30 and the bar member 40 are stably held between the magnetic pole plates 24 while maintaining a gap A of a cylindrical shape between the outer peripheral surface of the permanent magnet 30 and of the bar member 40 and the inner peripheral surface of the through hole 13. Though in the composite magnet 100 shown in FIG. 17, the permanent magnet 30 is disposed in an end of the iron core 10, there can be further proposed an embodiment in which the permanent magnet 30 is disposed at the other end or an embodiment in which the permanent magnets 30 are disposed at both ends (none of them are illustrated). The composite magnet 100 shown in FIG. 17 has no nonmagnetic hollow member 50 compared to the composite magnet 100 shown in FIG. 8. Therefore, the composite magnet 100 can be produced using a decreased number of parts and at a decreased cost. There can be further proposed an embodiment in which the above nonmagnetic hollow member 50 is fitted into the nonmagnetic region A, as a matter of course.

Figure 18:
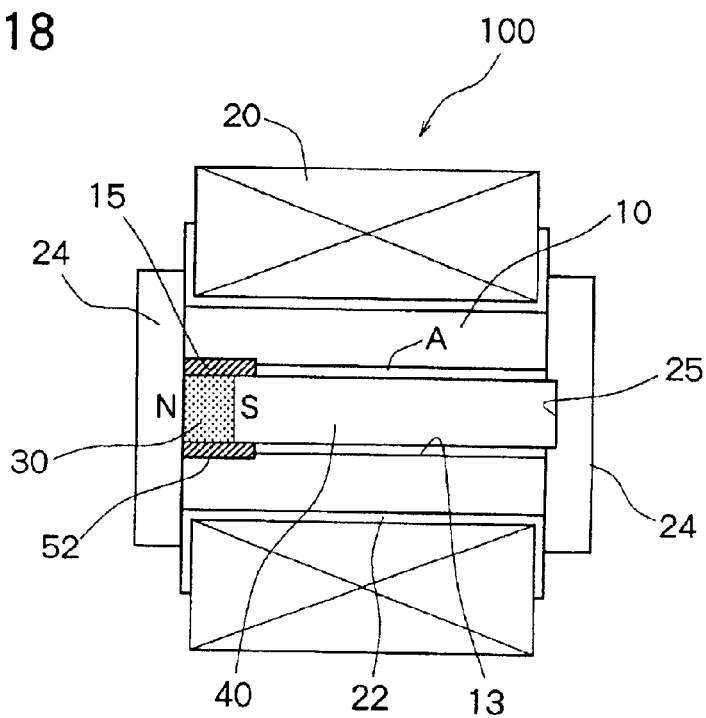
FIG. 18 is a longitudinal sectional view schematically illustrating a further embodiment of the composite magnet of electromagnet and permanent magnet according to the present invention.

FIG. 18 illustrates a still further embodiment of the composite magnet 100. In the composite magnet 100 shown in FIG. 18, a large diameter portion 15 having an inner diameter larger than that of the through hole 13 is formed in one end portion of the through hole 13 in the iron core 10. The large diameter portion 15 is located in line with an axis common to the through hole 13 and has a length in the axial direction which is so short as not to exceed the range of a region at one end of the through hole 13 in the iron core 10. A nonmagnetic hollow member 52 is fitted into the large diameter portion 15. The nonmagnetic hollow member 52 is made of the same material as the nonmagnetic hollow member 50 mentioned earlier and has a length in the axial direction, which is nearly the same as the length of the large diameter portion 15 in the axial direction. A recessed portion 25 is formed in the inner side surface of the other magnetic pole plate 24. The recessed portion 25 has substantially the same constitution as the recessed portion 25 in the composite magnet 100 shown in FIG. 17. The permanent magnet 30 having a length in the axial direction shorter than the nonmagnetic hollow member 52 is nearly intimately fitted into one end portion of the nonmagnetic hollow member 52. An end of the bar member is nearly intimately fitted to the other end portion of the nonmagnetic hollow member 52, and the other end of the bar member 40 is nearly intimately fitted to the recessed portion 25 in the other magnetic pole plate 24. The other end surface of the permanent magnet 30 is nearly intimately contacted to one end surface of the bar member 40. A cylindrical hollow portion, i.e., a nonmagnetic region A, is formed between the outer peripheral surface of the bar member 40 of a region other than the one end that is fitted to the nonmagnetic hollow member 52 and the inner peripheral surface of the corresponding through hole 13. The nonmagnetic region A is formed by only a gap of a cylindrical shape, i.e., by only an air gap of a cylindrical shape.

In the composite magnet 100 shown in FIG. 18 as described above, the permanent magnet 30 and one end of the bar member 40 are fitted to the nonmagnetic hollow member 52 that is firmly held by the large diameter portion 15 and the magnetic pole plate 24 so as not to move in the radial direction and the axial direction, and the other end of the bar member 40 is fitted to the recessed portion 25 of the other magnetic pole plate 24. Accordingly, the permanent magnet 30 and the bar member 40 are stably held between the magnetic pole plates 24 while maintaining a cylindrical gap A between the outer peripheral surface of the bar member 40 of the region other than the one end portion fitted to the nonmagnetic hollow portion 52 and the inner peripheral surface of the corresponding through hole 13. Though in the composite magnet 100 shown in FIG. 18, the permanent magnet 30 is disposed in an end of the iron core 10, there can be also proposed an embodiment in which the permanent magnet 30 is similarly disposed in the other end thereof or an embodiment in which the permanent magnets 30 are similarly disposed in both ends thereof (none of them are shown). In the composite magnet 100 shown in FIG. 18, the nonmagnetic hollow member 52 is enough to be shorter than that in the composite magnet 100 shown in FIG. 8. Therefore, the composite magnet 100 can be produced at a further decreased cost.

Figure 19:
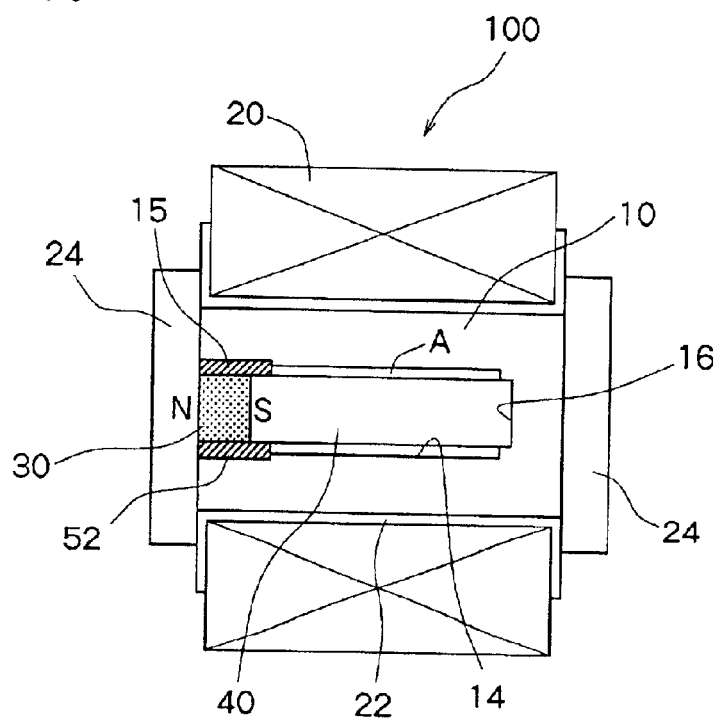
FIG. 19 is a longitudinal sectional view schematically illustrating a further embodiment of the composite magnet of electromagnet and permanent magnet according to the present invention.

FIG. 19 illustrates a yet further embodiment of the composite magnet 100. In the composite magnet 100 shown in FIG. 19, a one end-closed hole 14 similar to that of the composite magnet 100 shown in FIG. 16 is formed in the iron core 10. Further, a recessed portion 16 is formed in the closed end of the one end-closed hole 14 in the iron core 10. The recessed portion 16 has substantially the same constitution as the recessed portion 25 in the composite magnet 100 shown in FIG. 17. A large diameter portion 15 having an inner diameter larger than that of the one end-closed hole 14 is formed in one end of the one end-closed hole 14 in the iron core 10. A nonmagnetic hollow member 52 is fitted to the large diameter portion 15 similarly to the composite magnet 100 shown in FIG. 18, the large diameter portion 5 being formed having the same constitution as that of the composite magnet 100 shown in FIG. 18. The nonmagnetic hollow member 52 is made of the same material as the nonmagnetic hollow member 50 described earlier. The permanent magnet 30 is nearly intimately fitted to one end portion of the nonmagnetic hollow member 52, and an end of the bar member is nearly intimately fitted to the other end portion of the nonmagnetic hollow member 52 (the above constitution is the same as that of the composite magnet 100 shown in FIG. 18). The other end of the bar member 40 is nearly intimately fitted to the recessed portion 16 of the one end-closed hole 14. The other end surface of the permanent magnet 30 is intimately contacted to the one end of the lever member 40. A cylindrical hollow portion, i.e., a nonmagnetic region A, is formed between the outer peripheral surface of the bar member 40 of a region other than the one end portion fitted to the nonmagnetic hollow member 52 and the inner peripheral surface of the corresponding one end-closed hole 14. The nonmagnetic region A is formed by only a gap of a cylindrical shape, i.e., by only an air gap of a cylindrical shape.

Figure 20:
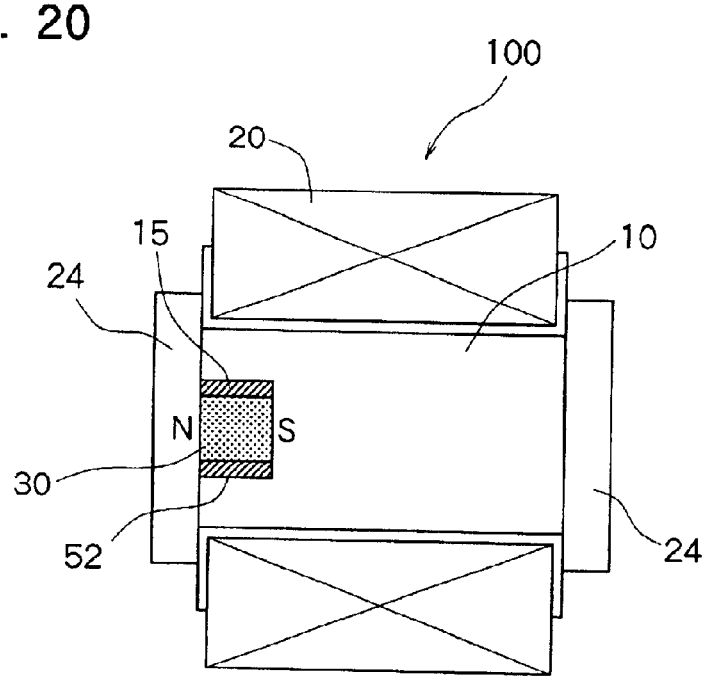
FIG. 20 is a longitudinal sectional view schematically illustrating another embodiment of the composite magnet of electromagnet and permanent magnet according to the present invention.

In the composite magnet 100 shown in FIG. 19, as described above, the permanent magnet 30 and the one end of the bar member 40 are fitted to the nonmagnetic hollow member 52 which is firmly held by the large diameter portion 15 and the magnetic pole plate 24 so as not to move in the radial direction and the axial direction, and the other end of the bar member 40 is fitted to the recessed portion 16 formed in the closed end of the one end-closed hole 14 in the iron core 10. Accordingly, the permanent magnet 30 and the bar member 40 are stably held between the one magnetic pole plate 24 and the recessed portion 16 in the iron core 10 while maintaining a cylindrical gap A between the outer peripheral surface of the bar member 40 of the region other than the one end portion fitted to the nonmagnetic hollow member 52 and the inner peripheral surface of the corresponding one end-closed hole 14. In the composite magnet 100 shown in FIG. 19, the nonmagnetic hollow member 52 is enough to be shorter than that of the composite magnet 100 shown in FIG. 8. Therefore, the composite magnet 100 can be produced at a decreased cost. FIG. 20 illustrates a further simplified constitution of the composite magnet 100 shown in FIG. 19. That is, the composite magnet 100 shown in FIG. 20 does not use the bar member 40 used in the composite magnet 100 shown in FIG. 19. Besides, the length of the permanent magnet 30 in the axial direction is brought into agreement with that of the nonmagnetic hollow member 52, and the one end-closed hole 14 has a length in the axial direction which is shortened to be in agreement with the lengths of the permanent magnet 30 and the nonmagnetic hollow member 52 in the axial direction. The present invention holds true even relying upon the thus simplified constitution.

Figure 21:
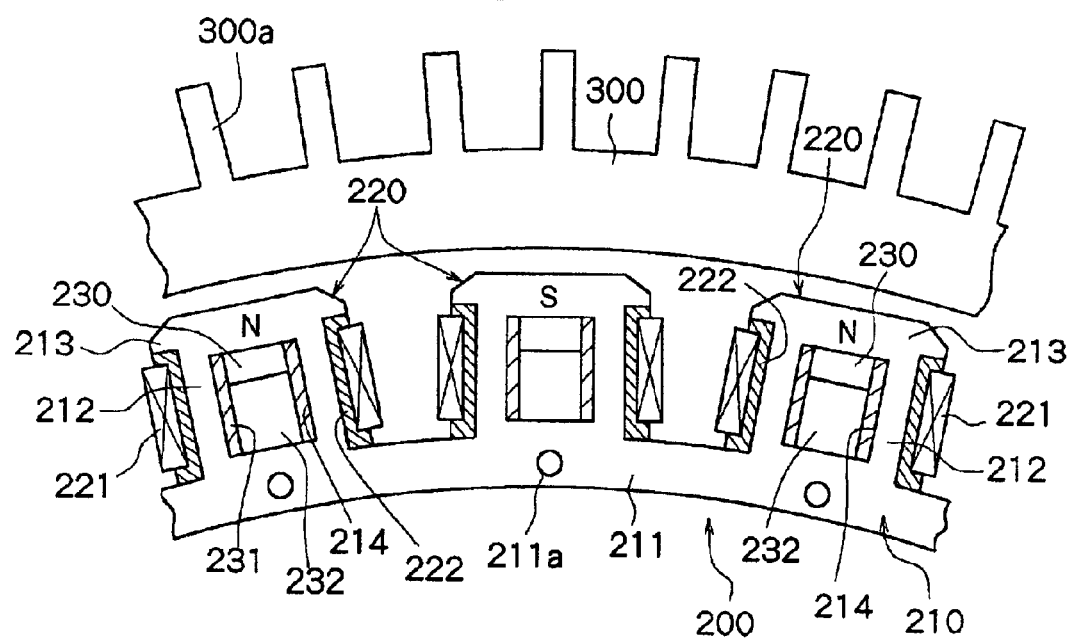
FIG. 21 is a transverse sectional view illustrating a main portion of the an embodiment of the eddy current retarder according to the present invention.
Figure 22:
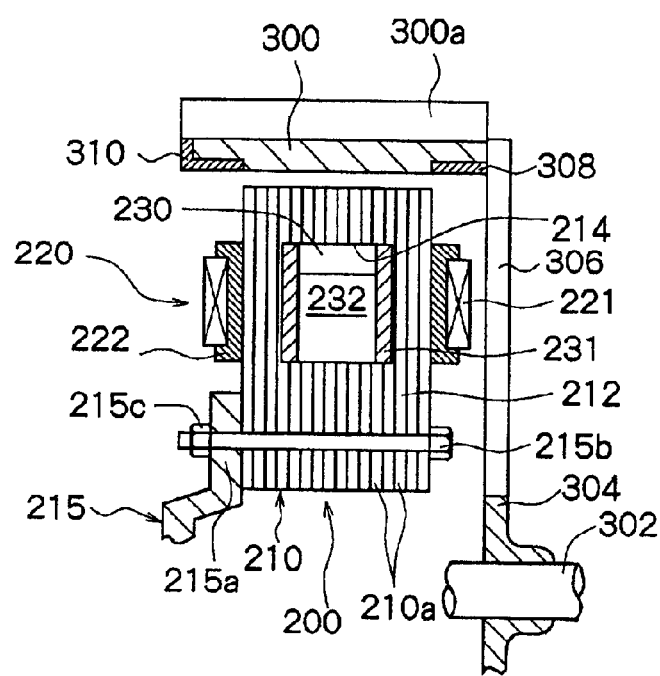
FIG. 22 is a longitudinal sectional view illustrating a main portion of the eddy current retarder shown in FIG. 21.
Figure 23:
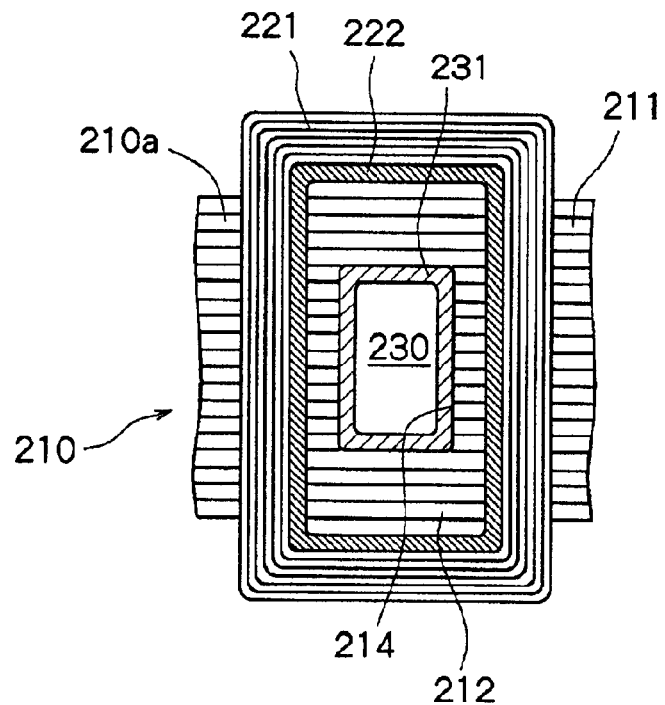
FIG. 23 is a transverse sectional view of the composite magnet provided in the eddy current retarder shown in FIG. 21.

Next, embodiments of the eddy current retarder (eddy current retarder equipped with the composite magnet) according to the present invention will be described with reference to FIGS. 21 to 35. Referring to FIGS. 21 to 23, first, the eddy current retarder has a stationary magnet unit 200 and a brake drum 300. Plural support arms 306 radially protruding from the boss 304 are arranged on a boss 304 that is coupled to a rotary shaft 302 of a transmission (not shown) of, for example, a truck. Ends in the axial direction of the brake drum 300 that is a rotor are welded to the ends of the support arms 306, by welding. Plural heat-radiating fins 300a are formed on the outer peripheral surface of the brake drum 300. Annular members 308 and 310 made of a good conductor such as copper or a copper alloy are welded to the brake drum 300 formed of a ferromagnetic material having a large magnetic permeability such as iron or the like by means of padding (e.g., TIG welding), plasma jet or the like. The annular member 308 is welded to an inner peripheral surface at one end of the brake drum 300 in the axial direction, has a predetermined width in the axial direction and a predetermined thickness in the radial direction in a state of it being welded to the brake drum 300, and has a slender rectangular shape in transverse cross section in the axial direction. The annular member 310 is welded to the brake drum 300 across the inner peripheral surface at the other end in the axial direction and the other end surface in the axial direction, and has a predetermined thickness and substantially an L-shape in transverse cross section in a state of it being welded to the brake drum 300. The inner peripheral surface of the annular member 308 and the inner peripheral surface of a portion of the annular member 310 are positioned substantially on the inner peripheral surface of the brake drum 300, and the other portion of the annular member 310 is positioned substantially on the other end surface of the brake drum 300 in the axial direction. The annular members 308 and 310 arranged on the brake drum 300 as described above promote the spread in the axial direction of eddy current generated in the brake drum 300 to further improve the braking performance. The braking performance is improved by arrangement of the annular members made of a good conductor such as copper or a copper alloy on the inner peripheral surface and/or on the end surface of the brake drum 300.

The stationary magnet unit 200 has a support member 210, electromagnets 220 and permanent magnets 230. The support member 210 comprises an annular base portion 211, plural iron core portions 212 extending outward in the radial direction from the outer periphery of the base portion 211 at equal distances in the circumferential direction, and magnetic pole pieces 213 disposed at the ends of the iron core portions 212 so as to be opposed to the inner peripheral surface of the brake drum 300. The support member 210 is formed, as a unitary structure, of plural electromagnetic steel plates 210a having substantially the same shape to each other, i.e., is a laminate of the electromagnetic steel plates 210a by laminating them in the axial direction. As viewed in the axial direction, the base portion 211 is formed in a circular shape having a predetermined width in the radial direction, the iron core portions 212 have substantially a rectangular shape, the magnetic pole pieces 213 are of the shape of a plate extending in the circumferential direction and both ends thereof in the circumferential direction are so formed as to protrude in the circumferential direction from both ends in the circumferential direction of the corresponding iron core portions 212. A coil 221 is arranged on each iron core portion 212 via a bobbin 222 so as to cover the outer peripheral surface thereof. The bobbin 222 can be formed of an insulating material such as a heat-resistant synthetic resin or an insulating paper. Instead, however, the outer peripheral surfaces of the iron core portions 212 may be coated with an insulating material. The electromagnets 220 are formed by the iron core portions 212 and the coils 221 arranged to cover the outer peripheral surfaces of the iron core portions 212.

In each iron core portion 212, there is buried at least one permanent magnet 230, in this embodiment in a number of one, with its magnetic pole surface being directed in the radial direction. More specifically, an inner space 214 of substantially a rectangular parallelopiped shape is formed in each iron core portion 212. A cylindrical nonmagnetic member 231 having a rectangular shape in cross section is fitted into each inner space 214 with its both open ends being directed in the radial direction. A permanent magnet 230 and a ferromagnetic member 232 both having a parallelopiped rectangular shape are intimately inserted in the nonmagnetic member 231 in a manner of being intimately contacted to each other in the radial direction. The nonmagnetic members 231 can be formed of a nonmagnetic material such as aluminum, an austenite-based stainless steel or a heat-resistant synthetic resin. In each of the nonmagnetic members 231, the Nd—Fe—B based permanent magnet 230, for example, is positioned on the outer side in the radial direction so as to allow the magnetic pole surface thereof to direct toward the radial direction, and the ferromagnetic member 232 is positioned on the inner side in the radial direction. The inner space 214 is formed by forming an opening of a rectangular shape as viewed in the axial direction only in the electromagnetic steel plates present in the intermediate portion in the axial direction of the laminate in each of the iron core portions 212 of the support member 210 formed by laminating the electromagnetic steel plates 210a in the axial direction. In each iron core portion 212, a composite magnet is formed by the electromagnet 220 and the permanent magnet 230. The magnetic pole surfaces of the permanent magnets 230 neighboring in the circumferential direction on the support member 210 are disposed so as to have polarities different from each other. Further, the direction of magnetization of the iron core portion 212 due to each the electromagnet 220 is defined to be in agreement with the direction of magnetic pole of the corresponding permanent magnet 230.

The stationary magnet unit 200 is mounted on a stationary frame 215. The stationary frame 215 secured to the transmission (not shown) has an annular support plate portion 215a which is so arranged that the direction of the thickness thereof is in agreement with the axial direction of the rotary shaft 302. The stationary magnet unit 200 is supported by the stationary frame 215 by superposing the base portion 211 of the support member 210 thereof on the support plate portion 215a of the stationary frame 215 and fastening them together as a unitary structure by using bolts 215b and nuts 215c. In order to enable the fastening by bolts 215b and nuts 215c, through holes 211a for inserting the bolts 215b are formed in a plural number in the base portion 211 of the support member 210 at equal intervals in the circumferential direction, and through holes (not shown) for inserting bolts 215b are also formed in the support plate portion 215a of the stationary frame 215 at positions, in the circumferential direction, corresponding to the above through holes 211a. Rivets may be used instead of bolts 215b and nuts 215c.

Figure 24:
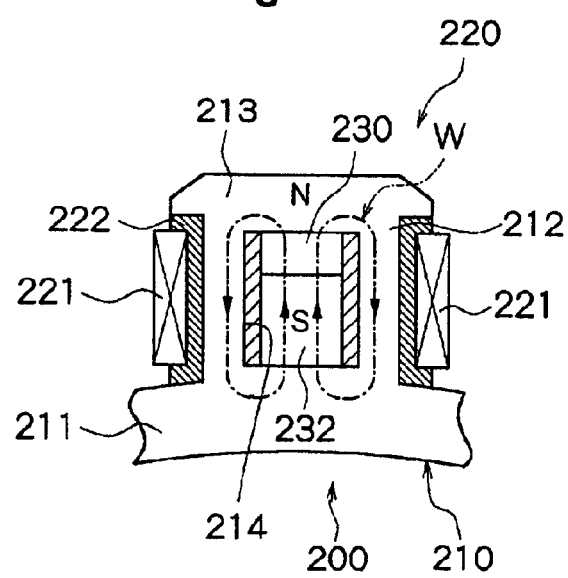
FIG. 24 is a longitudinal sectional view illustrating a state where no current is supplied to the electromagnet, in the eddy current retarder shown in FIG. 21.

Referring to FIG. 24, when a current is not supplied to the coils 221 of the electromagnets 220, i.e., in a case where the braking is not applied, no magnetic field is formed in the electromagnets 220. Further, a loop-like short-circuit magnetic circuit W is formed through the permanent magnet 230 buried inside each of the iron core portions 212, magnetic pole piece 213, iron core portion 212, base portion 211 and ferromagnetic member 232 to prevent magnetic flux from leaking to the outer side. Accordingly, the brake drum 300 is not affected by the magnetic field due to the permanent magnet 230. Namely, the brake drum 300 receives no braking torque.

Figure 25:
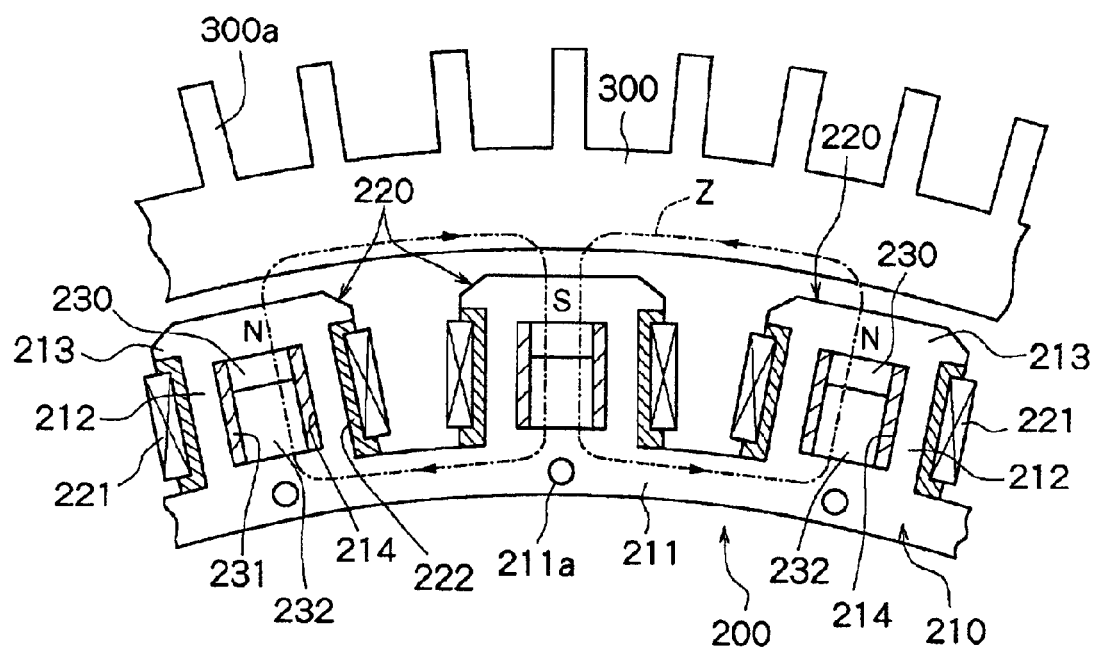
FIG. 25 is a transverse sectional view of a main portion illustrating a state where a current is supplied to the electromagnet, in the eddy current retarder shown in FIG. 21.

Referring to FIG. 25, when a current is supplied to the coils 221 of the electromagnets 220, a magnetic flux in a direction that is in agreement with the direction of the magnetic pole of the permanent magnets 230 is formed in the iron core portions 212. Accordingly, each of the composite magnets form a composite magnetic field composed of magnetic flux generated in the iron core portion 212 and the magnetic flux of the permanent magnet 230, and a magnetic circuit Z is formed respectively between the composite magnets which are neighboring to each other in the circumferential direction and the brake drum 300. When the brake drum 300 that is revolving traverses the magnetic fluxes generated by the electromagnet 220 and the permanent magnet 230, a braking torque is produced due to the eddy current generated in the brake drum 300.

As will be obvious from the foregoing description, when the current is supplied to the coils 221 of the electromagnets 220 in the eddy current retarder of the present invention, each of the composite magnets establishes a composite magnetic field composed of the magnetic flux generated in the iron core portion 212 and the magnetic flux of the permanent magnet 230, and a braking force is produced in the brake drum 300 due to the eddy current generated by the composite magnetic flux. As a result, there can be realized the eddy current retarder having smaller size and reduced weight compared with those of the conventional eddy current retarder utilizing the electromagnet, and a production cost can be decreased. Further, the eddy current retarder can be realized in a compact size since it does not require the actuator that is indispensable in the conventional eddy current retarder utilizing permanent magnets. Further, a change over between non-braking and braking can be done and the braking force can be controlled, by simply controlling the current of the coil, to advantage in practice. The above composite magnet has a length in the axial direction shorter than that of the prior art (in its shortest, by nearly one-half that of the prior art) and, hence, the inner diameter of the brake drum 300 can be shortened to advantage in space.

Figure 26:
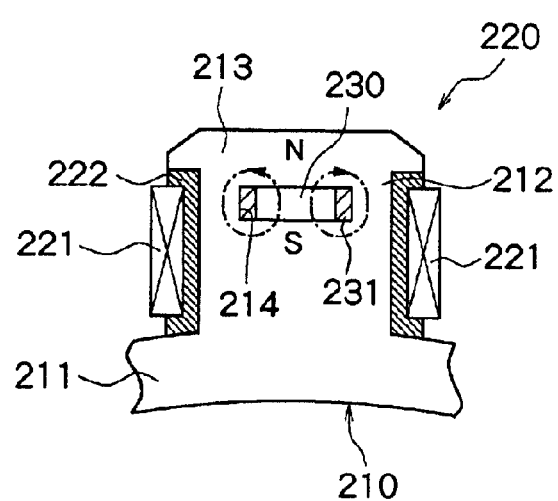
FIG. 26 is a longitudinal sectional view illustrating a further embodiment of the composite magnet provided in the eddy current retarder according to the present invention, and illustrating a state where no electric current is supplied to the electromagnet.
Figure 27:
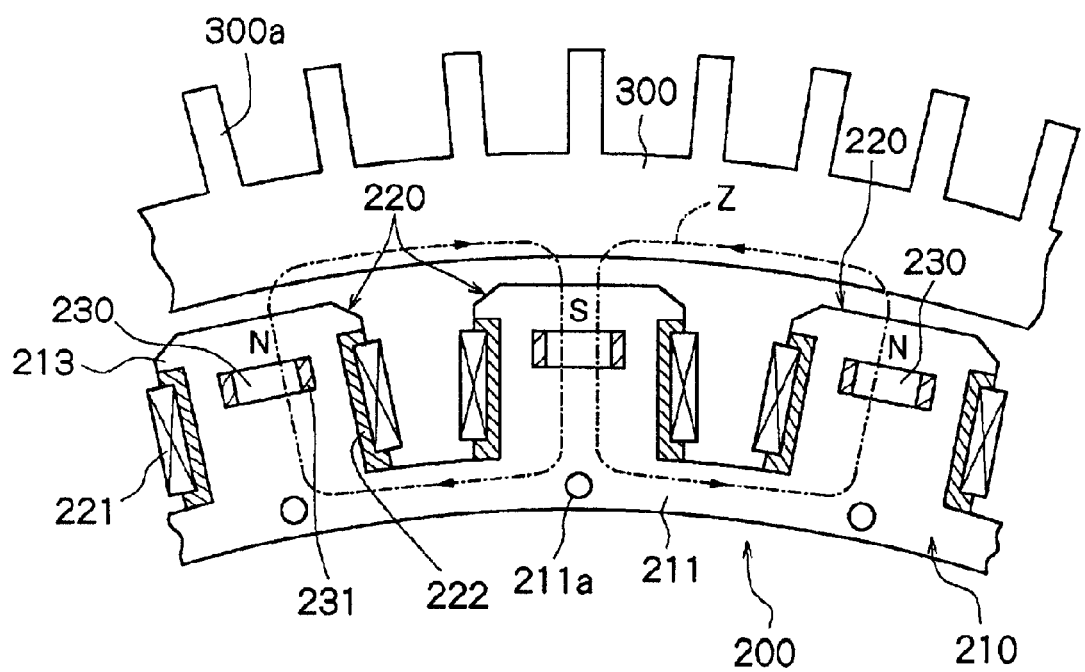
FIG. 27 is a transverse sectional view illustrating a main portion of the eddy current retarder that is equipped with composite magnet shown in FIG. 26 and illustrates a state where a current is supplied to the electromagnet.
Figure 28:
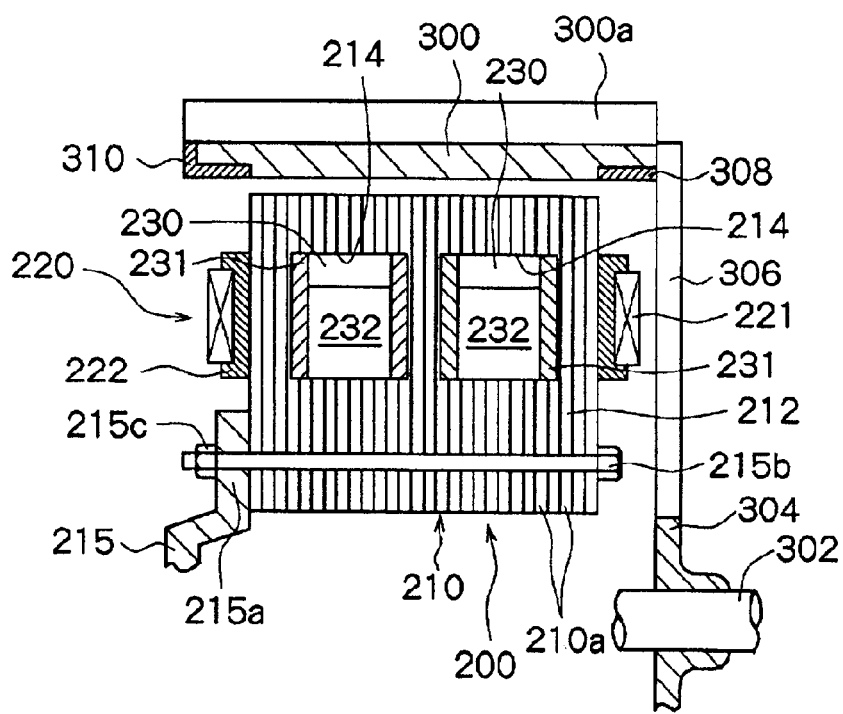
FIG. 28 is a longitudinal sectional view illustrating another embodiment of the composite magnet provided in the eddy current retarder according to the present invention.

In the above-mentioned embodiment, the support member 210 is constituted by laminating, in the axial direction, plural electromagnetic steel plates 210a that are formed as a unitary structure in an annular shape. The support member 210, however, may be constituted by laminating, in the axial direction, plural electromagnetic steel plates that are divided in the circumferential direction. Further, plural blocks may be laminated in the axial direction, or plural blocks divided in the circumferential direction may be laminated in the axial direction. In the above embodiment, the permanent magnet 230 and the ferromagnetic member 232 are buried in each inner space 214 of the iron core portion 212. As shown in FIGS. 26 and 27, however, even only the permanent magnet 230 with its magnetic pole surface being directed in the radial direction is buried in the iron core portion 212 via the nonmagnetic member 231, the same effect as that of the embodiment shown in FIGS. 24 and 25 can be obtained. As shown in FIG. 28, further, plural inner spaces 214 may be formed in each iron core portion 212 at intervals in the axial direction to fit the cylindrical nonmagnetic member 231 into each space 214, and the permanent magnet 230 and the ferromagnetic member 231 may be buried in the nonmagnetic member 231 in the same manner as in the embodiment shown in FIGS. 21 to 23, or the permanent magnet 230 only may be buried in the same manner as in the embodiment shown in FIGS. 26 and 27.

Figure 29:
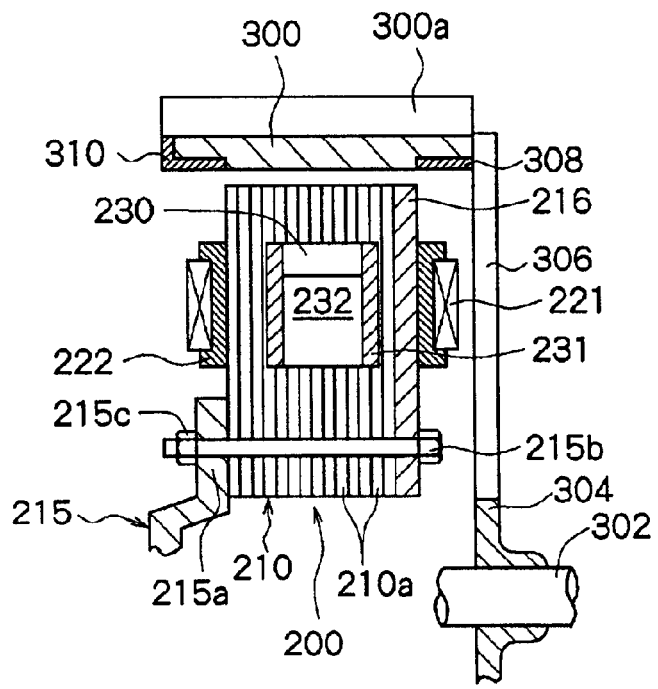
FIG. 29 is a longitudinal sectional view of a main portion of another embodiment of the eddy current retarder according to the present invention.

FIG. 29 illustrates another embodiment of the eddy current retarder according to the present invention. In this embodiment, a reinforcing plate 216 of nearly the same shape as the electromagnetic steel plate 210a but thicker than the electromagnetic steel plate 210a is superposed on one end surface of the support member 210 in the axial direction (right end surface in FIG. 29). The reinforcing plate 216 constitutes a part of the support member 210. The other end surface of the support member 210 in the axial direction is superposed on the support plate portion 215a of the stationary frame 215 and is fastened by using bolts 215b and nuts 215c in the same manner as in the embodiment shown in FIG. 22. In this embodiment, the support member 210 exhibits a further improved rigidity than that of the earlier embodiments and is more firmly mounted on the stationary frame 215.

Figure 30:
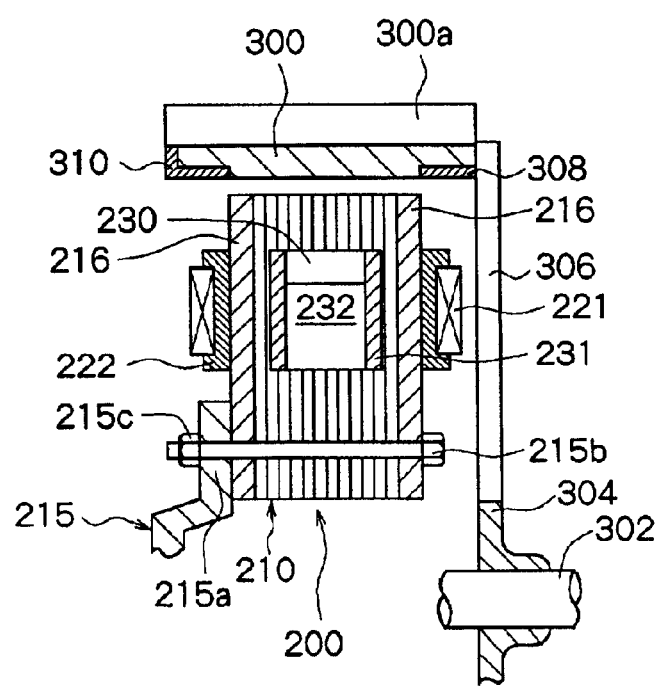
FIG. 30 is a longitudinal sectional view of a main portion of a further embodiment of the eddy current retarder according to the present invention.

FIG. 30 illustrates a further embodiment of the eddy current retarder according to the present invention. In this embodiment, the reinforcing plate 216 is superposed on both end surfaces of the support member 210 in the axial direction. Each reinforcing plate 216 constitutes a part of the support member 210. The support member 210 is superposed at the other end surface in the axial direction (constituted by one reinforcing plate 216) on the support plate portion 215a of the stationary frame 215, and is fastened by bolts 215b and nuts 215c in the same manner as in the embodiment shown in FIG. 22. In this embodiment, the support member 210 exhibits a further improved rigidity than that of the embodiment shown in FIG. 29 and is more firmly mounted on the stationary frame 215.

Figure 31:
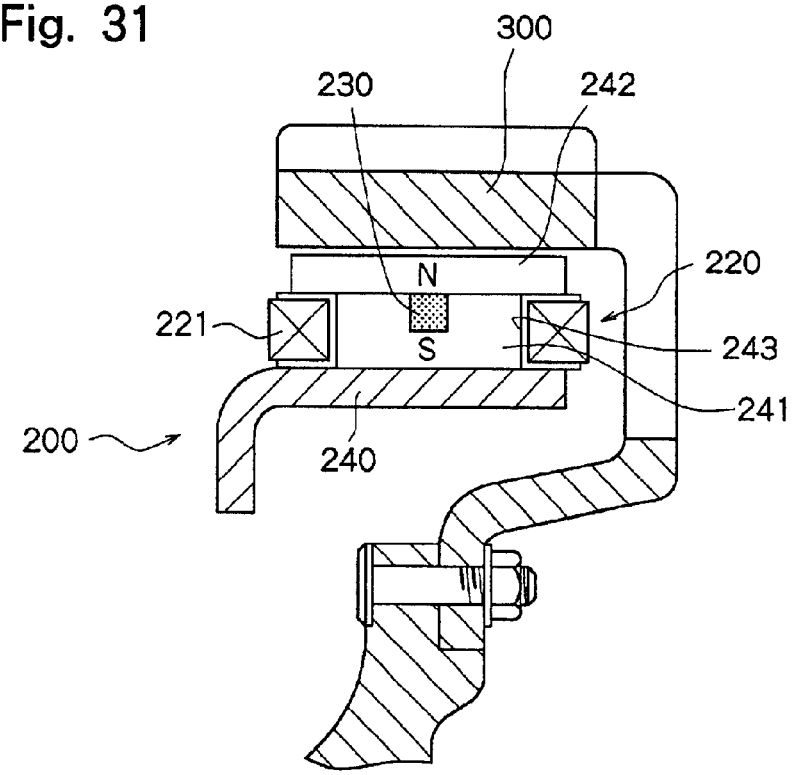
FIG. 31 is a longitudinal sectional view of a main portion of a still further embodiment of the eddy current retarder according to the present invention.
Figure 32:
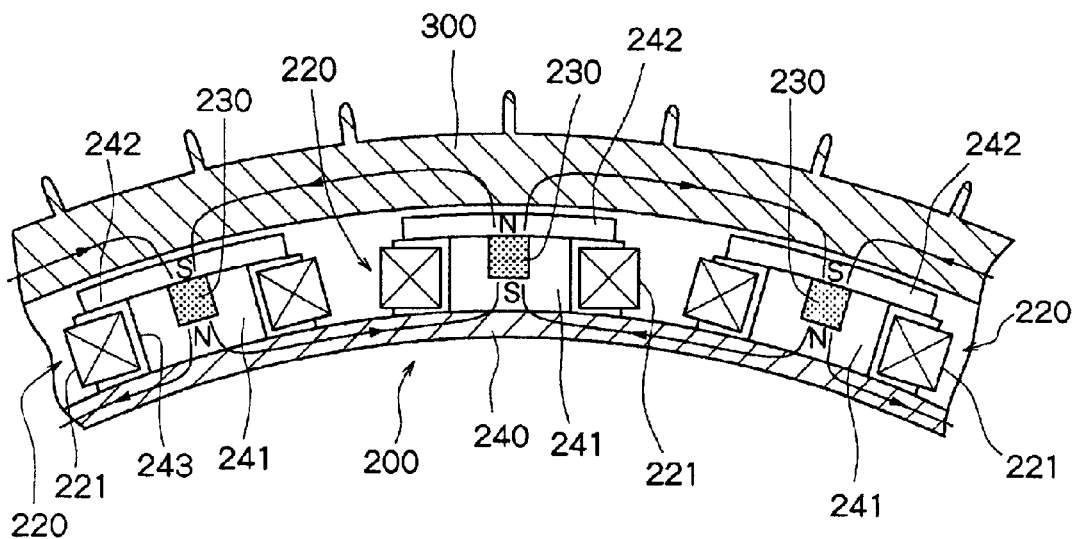
FIG. 32 is a transverse sectional view of a main portion of the eddy current retarder shown in FIG. 31.

FIGS. 31 and 32 illustrate a still further embodiment of the eddy current retarder according to the present invention. A brake drum 300 is mounted on the rotary shaft 302 (not shown). A stationary magnet unit 200 is disposed on the inside in the radial direction of the brake drum 300. The stationary magnet unit 200 includes an annular stationary support cylinder 240, plural iron cores 241 arranged on the outer periphery of the stationary support cylinder 240 at intervals in the circumferential direction, magnetic pole plates 242 disposed at the end of the iron cores 241 so as to be opposed to the inner peripheral surface of the brake drum 300, electromagnets 220 formed of the iron cores 241 and coils 221 arranged via a bobbin 243 to cover the outer peripheral surfaces of the iron cores 241, and a permanent magnet 230 with the magnetic pole surface being directed in the radial direction, buried in a number of at least one, in this embodiment in a number of one, in each iron core 241. The stationary support cylinder 240 formed of a magnetic material such as iron or the like is secured to a transmission case that is not shown. In each iron core 241, a composite magnet is formed by the electromagnet 220 and the permanent magnet 230. The composite magnet is constituted by the composite magnet 100 shown in FIGS. 1 and 2. The magnetic pole surfaces of the permanent magnets 230 neighboring in the circumferential direction on the stationary support cylinder 240 are disposed so as to have polarities different from each other. Further, the direction of magnetization of the iron core 241 of each electromagnet 220 is in agreement with the direction of pole of the corresponding permanent magnet 230. The outer surface of the magnetic pole plate 242 formed of a ferromagnetic material such as iron or the like is positioned to be opposed to the inner peripheral surface of the brake drum 300 maintaining a gap. In the illustrated embodiment, the permanent magnets 230 are disposed at the outer end portions of the composite magnets in the radial direction and are so arranged that the magnetic poles neighboring in the circumferential direction have polarities different from each other. When a current is supplied to the coils 221 of the electromagnets 220, a magnetic circuit is formed among the brake drum 300, stationary support cylinder 240 and composite magnets (see FIG. 32), and the brake to the brake drum 300 is operated. The composite magnets can be shortened in the axial direction (in its shortest, by nearly one-half that of the prior art). Accordingly, the inner diameter of the brake drum 300 can be shortened to advantage in space.

Figure 33:
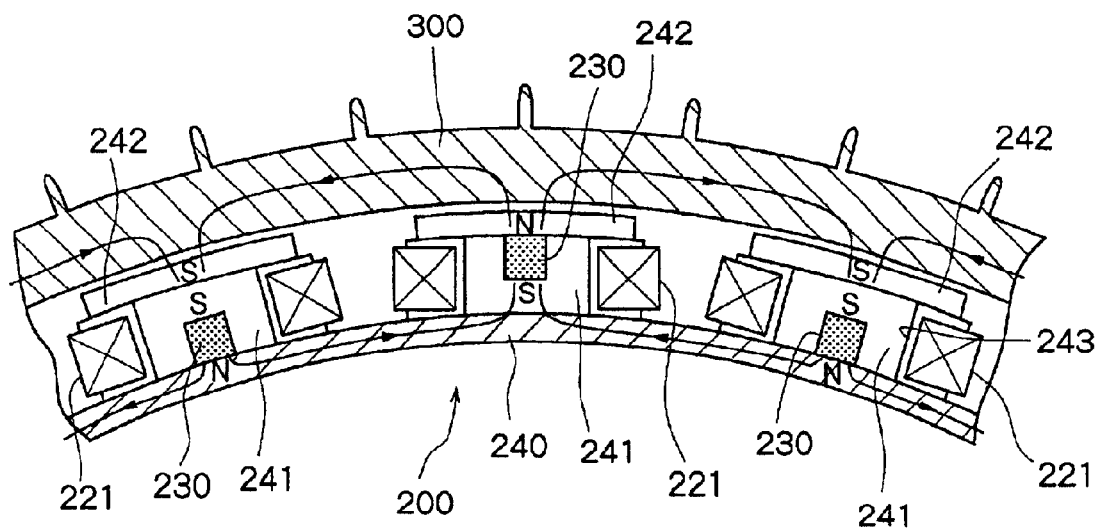
FIG. 33 is a transverse sectional view of a main portion of another embodiment of the eddy current retarder according to the present invention.

FIG. 33 illustrates a still further embodiment of the eddy current retarder according to the present invention, which is a modification from the eddy current retarder shown in FIGS. 31 and 32. In the composite magnets of FIG. 33, the permanent magnets 230 are alternately arranged in the circumferential direction at the outer end portion in the radial direction and at the inner end portion in the radial direction and is so disposed that the direction of the magnetic poles neighboring in the circumferential direction have polarities different from each other. In other respects, the constitution is substantially the same as that of the eddy current retarder shown in FIGS. 31 and 32. This embodiment, too, exhibits substantially the same action and effect as those of the eddy current retarder shown in FIGS. 31 and 32.

Figure 34:
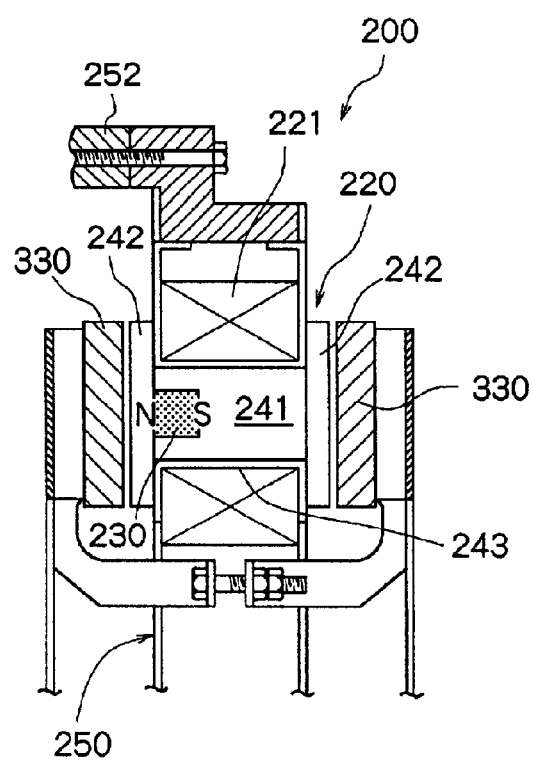
FIG. 34 is a longitudinal sectional view of a main portion of another embodiment of the eddy current retarder according to the present invention.
Figure 35:
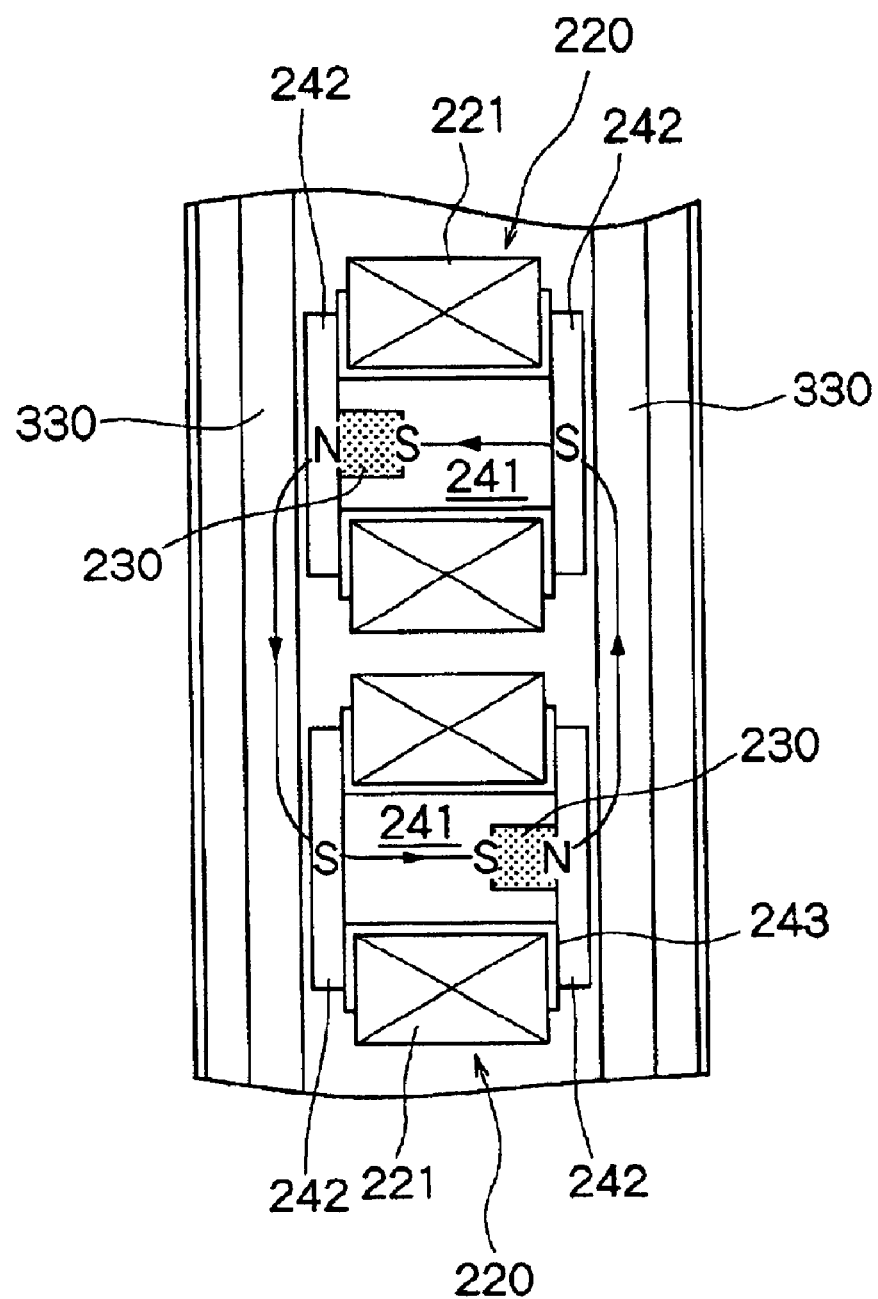
FIG. 35 is a plan view illustrating a main portion of the eddy current retarder shown in FIG. 34.

FIGS. 34 and 35 illustrate a main portion of a yet further embodiment of the eddy current retarder according to the present invention. On the rotary shaft 302 (not shown) are secured a pair of brake disks 330 that are rotors at a distance in the axial direction so as to rotate together as one. An annular stationary magnet unit 200 is disposed between the brake disks 330 formed of a suitable magnetic material. The stationary magnet unit 200 comprises an annular stationary support frame 250, plural iron cores 241 disposed on the stationary support frame 250 at intervals in the circumferential direction, magnetic pole plates 242 disposed at both ends of the iron cores 241 so as to be opposed to the inner surfaces of the brake disks 330 opposed to each other, electromagnets 220 formed by the iron cores 241 and the coils 221 arranged, via a bobbin 243, so as to cover the outer peripheral surfaces of each iron core 241, and a permanent magnet 230 in a number of at least one, in this embodiment in a number of one, buried in each iron core 241 with the magnetic pole surface being directed in the axial direction. The stationary support frame 250 is secured to the transmission case 252. In each iron core 241, the composite magnet is formed by the electromagnet 220 and the permanent magnet 230. The outer surfaces of the magnetic pole plates 242 of the composite magnets in the axial direction are so positioned, maintaining a gap, as to be opposed to the inner surfaces of the corresponding brake disks 330 in the axial direction. The composite magnets are so disposed that the magnetic poles (constituted by the magnetic pole plates 242) neighboring in the circumferential direction have polarities different from each other. Further, the direction of magnetization in each iron core 241 of the electromagnet 220 is defined to be in agreement with the direction of magnetic pole of the corresponding permanent magnet 230. When a current is supplied to the coils 221 of the electromagnets 220, a magnetic circuit is formed among the brake disks 330 and composite magnets (see FIG. 35) to operate the brake to the brake disks 330. The composite magnets can be shortened in the axial direction compared to that of the prior art, and the gap between the brake disks 330 can be shortened (in its shortest, by nearly one-half that of the prior art), offering advantage in space.

Figure 36:
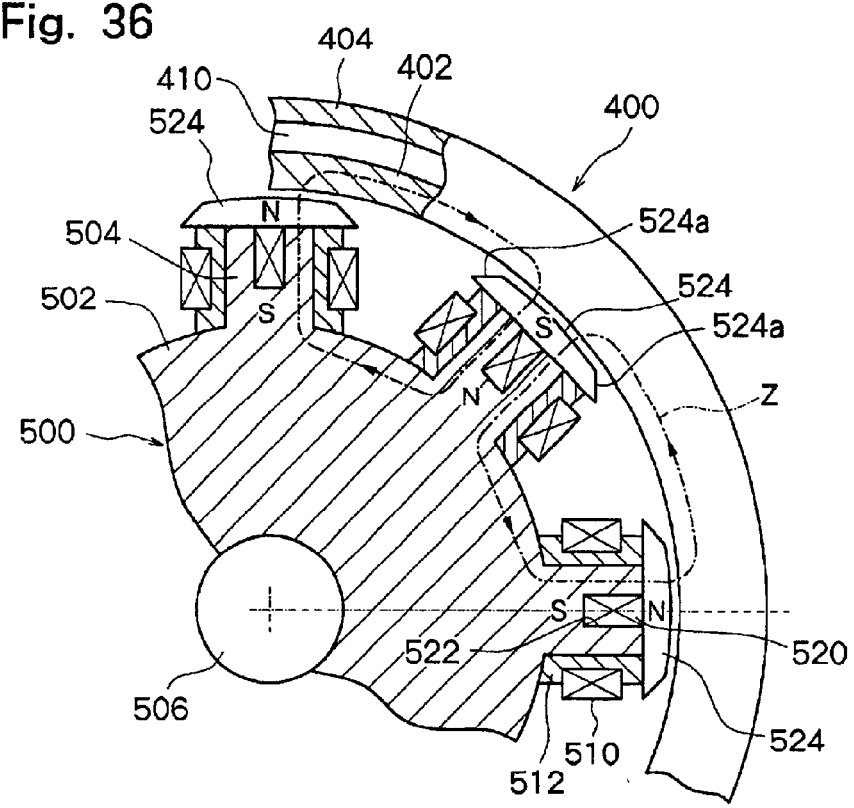
FIG. 36 is a transverse sectional view of a main portion illustrating an embodiment of the eddy current retarder according to the present invention, and illustrating a state where the brake is applied.
Figure 37:
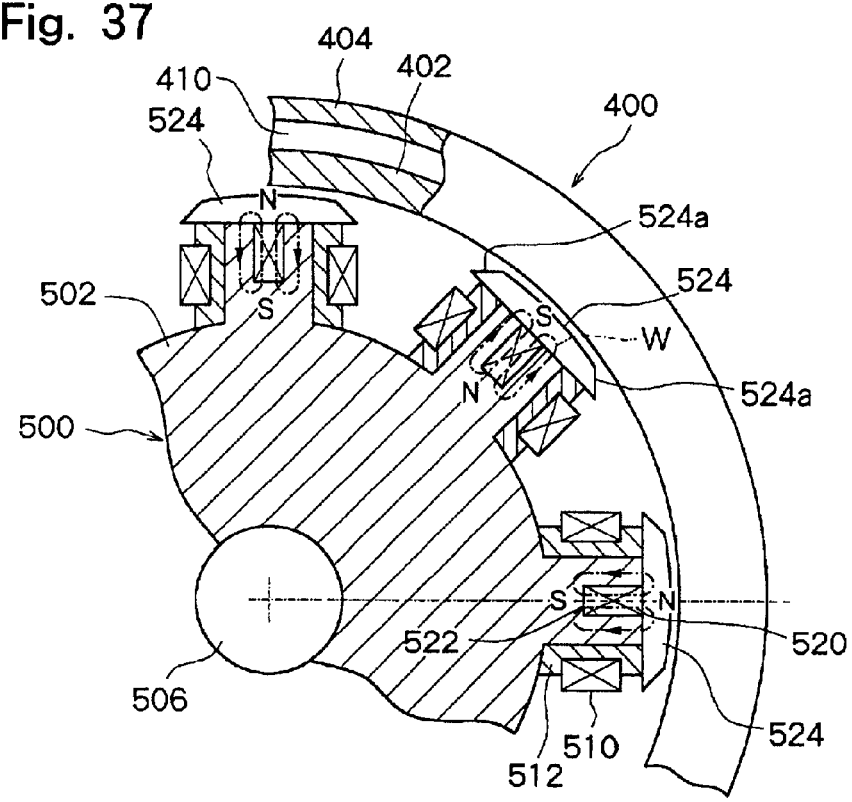
FIG. 37 is a transverse sectional view of a main portion illustrating an embodiment of the eddy current retarder according to the present invention, and illustrating a state where the brake is not applied.
Figure 38:
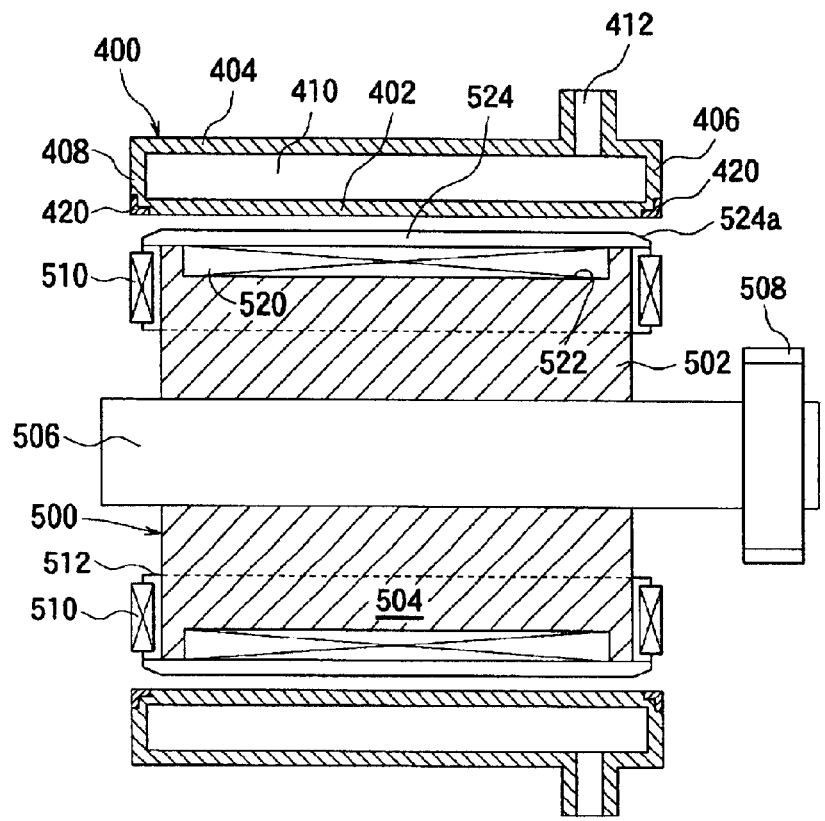
FIG. 38 is a longitudinal sectional view of the eddy current retarder shown in FIG. 36.

Next, embodiments of the eddy current retarder (in which annular members made of a good conductor such a copper or a copper alloy are coupled to the brake drum) of the present invention will be described with reference to FIGS. 36 to 59. Referring to FIGS. 36 to 38, first, the eddy current retarder according to the present invention comprises a stationary brake drum 400 and an annular magnet support member 500 rotated by a rotary shaft 506 that will be described later. The stationary brake drum 400 which is, for example, secured to the transmission case of a truck that is not shown (hereinafter simply referred to as brake drum 400), comprises an inner peripheral wall 402, an outer peripheral wall 404 disposed, at a gap, on the outer side of the inner peripheral wall 402 in the radial direction, one end wall 406 connecting the end of the inner peripheral wall 402 with the end of the outer peripheral wall 404 in the axial direction, and other end wall 408 connecting the other end of the inner peripheral wall 402 with the other end of the outer peripheral wall 404 in the axial direction. An internal space of substantially a rectangular shape in cross section, i.e., a liquid chamber 410, is formed in the brake drum 400 by the inner peripheral wall 402, outer peripheral wall 404, one end wall 406 and other end wall 408. A coolant inlet 412 and a coolant outlet 414 are formed in the liquid chamber 410. The coolant inlet 412, liquid chamber 410 and coolant outlet 414 are included in a portion of the coolant circulation passage that is not shown. A coolant is fed into the liquid chamber 410 through the inlet 412 from a coolant pump that is a coolant source (not shown), and is discharged through the outlet 414. The coolant pump and the coolant may be the water pump and the cooling water of the engine of the truck. Being constituted as described above, the whole brake drum 400 can be efficiently cooled and is prevented from being heated at high temperatures. The brake drum 400 in which the liquid chamber 410 is disposed is realized by forming, for example, a unit structure of the outer peripheral wall 404, one end wall 406 and other end wall 408 by using a general steel material (iron, cast steel, forging) or aluminum to prepare a main body of a channel shape in cross section, and welding the cylindrical inner peripheral wall 402 made of a low-carbon steel which is almost pure iron to the main body by welding.

Annular members 420 made of a good conductor such as copper or a copper alloy is coupled to the inner peripheral edge and/or to the end portion in the axial direction of the brake drum 400. In the embodiment of the eddy current retarder shown in FIGS. 36 to 38, one annular member 420 is coupled to one end in the axial direction of the brake drum 400 extending across the inner peripheral surface at the one end portion and the one end surface in the axial direction (across the inner peripheral surface of one end of the inner peripheral wall 402 and the surface of the one end wall 406 thereof) and it is coupled to the other end portion in the axial direction of the brake drum 400 extending across the inner peripheral surface of the other end portion and the other end surface in the axial direction (across the inner peripheral surface of the other end portion of the inner peripheral wall 402 and the other end wall 408 thereof). The annular members 420 can be welded to the brake drum 400 by alternately plating a nickel layer (or a nickel alloy layer) and a copper layer (or a copper alloy layer), or by brazing nickel, padding, padding a powder or plasma jet. In a state of it being welded to the brake drum 400, the annular members 420 have a predetermined thickness and substantially an L-shape in cross section. The inner peripheral surfaces of the annular members 420 are substantially positioned on the inner peripheral surface of the brake drum 400, and the surfaces of other portions of the annular members 420 are positioned substantially on one end surface and on the other end surface of the brake drum 400 in the axial direction.

The magnet support member 500 is disposed on the inside of the brake drum 400 in the radial direction. Plural magnets or composite magnets of a plural number in this embodiment are disposed on the outer periphery of the magnet support member 500 at intervals in the circumferential direction so as to be opposed to the inner peripheral surface of the brake drum 400. More specifically, the magnet support member 500 has a cylindrical main body 502 and plural iron core portions 504 formed on the outer periphery of the cylindrical main body 502 at a distance in the circumferential direction. Each iron core portion 504 has substantially a rectangular shape as viewed in the axial direction. The cylindrical main body 502 and the iron core portions 504 are formed by punching, as a unitary structure, a laminate of plural electromagnetic steel plates by a presser. The electromagnetic steel plates are welded together by caulking or by welding to constitute a laminate of an integral form. The magnet support member 500 constituted by a laminate of plural electromagnetic steel plates is coupled to the rotary shaft 506. A gear 508 is coupled to an end of the rotary shaft 506, and is in mesh, for example, with a gear coupled to the output shaft of the transmission that is not shown.

Coils 510 are disposed via bobbins 512 on the iron core portions 504 of the magnet support member 500 so as to cover the outer peripheral surfaces thereof. The bobbins 512 may be formed of an insulating material such as a heat-resistant synthetic resin or an insulating paper. Or, instead, the bobbins 512 may be formed by coating an insulating material on the outer peripheral surfaces of the iron core portions 504.

In each iron core portion 504 is buried at least one permanent magnet 520 with the magnetic pole surface being directed in the radial direction or, in this embodiment, the permanent magnet 520 in a number of one with the magnetic pole surface being directed in the radial direction. More specifically, a recessed portion 522 of substantially a parallelopiped shape is formed in each iron core portion 504. Each recessed portion 522 has a predetermined depth from the end of the corresponding iron core portion 504 toward the inside in the radial direction. A permanent magnet 520 having a parallelopiped shape is intimately inserted in each recessed portion 522 of the iron core portion 504. The outer end surface in the radial direction of the permanent magnet 520 is positioned substantially on the end surface of the corresponding iron core portion 504. A magnetic pole piece 524 is secured to the end of each iron core portion 504 as a unitary structure. The magnetic pole piece 524 formed of a ferromagnetic material such as iron or the like has such a size that it overhangs outward beyond the edge at each end of the corresponding iron core portion 504. The surface at the peripheral edge of each magnetic pole piece 524, the surface facing the inner peripheral surface of the brake drum 400, is constituted to have an inclined surface 524a which is so designed that the gap between the surfaces thereof and the inner peripheral surface of the brake drum 400 gradually increases toward the peripheral edges of the magnetic pole piece 524. This constitution permits the cool air to be easily introduced into a gap between the surfaces of the magnetic pole pieces 524 and the inner peripheral surface of the brake drum 400, effectively promoting the radiation of heat from the brake drum 400 and the magnet support member 500.

The electromagnets are formed by the iron core portions 504, corresponding coils 510 and magnetic pole pieces 524. The Nd—Fe—B based permanent magnet 520, for example, is so disposed in each recessed portion 522 of the iron core portion 504 that the magnetic pole surface is directed in the radial direction. The permanent magnets 520 neighboring on the magnet support member 500 in the circumferential direction is disposed to have magnetic pole surfaces of which the polarities are different from each other. Further, the direction of magnetization of each iron core portion 504 due to the electromagnet is defined to be in agreement with the direction of magnetic pole of the corresponding permanent magnet 520. Composite magnets are formed by the electromagnets and the corresponding permanent magnets 520.

When no current is supplied to the coils 510 of the electromagnets and no brake is applied, no electric field is formed by the electromagnets as shown in FIG. 37. Further, a loop-like short-circuited magnetic circuit W is formed through the permanent magnet 520 buried in each iron core portion 504, magnetic pole piece 524 and iron core portion 504 and hence, no magnetic flux leaks to the outer side. Therefore, the brake drum 400 is not affected by the permanent magnets 520. Accordingly, the brake drum 400 does not receive the braking torque.

When the current is supplied to the coils 510 of the electromagnets as shown in FIG. 36, a magnetic flux is generated in the iron core portions 504 in the directions identical to the direction of the magnetic poles of the permanent magnets 520. Accordingly, each composite magnet forms a composite magnetic field composed of the magnetic flux generated by the iron core portion 504 and the magnetic flux of the permanent magnet 520, and a magnetic circuit Z is formed through the composite magnets neighboring each other in the circumferential direction and the brake drum 400. When the brake drum 400 that is revolving traverses the magnetic fluxes of the electromagnet and of the permanent magnet 520, a braking torque is produced in the brake drum 400 due to the eddy current.

As is clearly illustrated in FIG. 38, annular members 420 made of a good conductor such as copper or a copper alloy are coupled to one end in the axial direction of the brake drum 400 extending across the inner peripheral surface of the one end portion and the one end surface in the axial direction, and to the other end in the axial direction of the brake drum 400 extending across the inner peripheral surface at the other end and the other end surface in the axial direction. Therefore, the flow passage of eddy current generated in the brake drum 400 spreads to a maximum of degree up to both ends in the axial direction of the brake drum 400 to produce an increased braking torque. Further, since the liquid chamber 410 inside the brake drum 400 is close, at its part of the regions, to the annular members 420, the annular members 420 as well as the brake drum 400 can be efficiently cooled even when the eddy current is concentrated in each annular member 420 as a result of applying the brake. Accordingly, the annular members 420 are prevented from being heated at high temperatures, eddy current can be generated in increased amounts in the brake drum 400, and the braking torque can be increased.

Resulting from an improvement in the efficiency for cooling the annular members 420 and the brake drum 400, the annular members which generates eddy current in increased amounts are prevented from being thermally deteriorated, increased braking force is obtained, and durability of the annular members 420 is maintained to a sufficient degree. Further, the junction portions between the annular members 420 and the brake drum 400 are free from peeling off or cracking, and durability is not spoiled. Besides, the annular members receive decreased thermal stress. Even when the centrifugal force is repetitively applied to the brake drum that is revolving at high speeds, therefore, no peeling or cracking occurs in the junction portions between the annular members and the brake drum, and the required durability is maintained.

In the eddy current retarder according to the present invention, when a current is supplied to the coils 520 of the electromagnets, each composite magnet forms a composite electric field composed of the magnetic flux generated in the iron core portion 504 and the magnetic flux of the permanent magnet 520, and a braking force is produced in the brake drum 400 based on the eddy current generated by the magnetic field. As a result, the eddy current retarder can be realized in a size and weight smaller than those of the conventional eddy current retarder utilizing electromagnets, and the production cost can be decreased. Further, change over between non-braking and braking and controlling of the braking force can be carried out by simply controlling the current of the coil, to advantage in practice. The above composite magnet has a length in the axial direction shorter than that of the prior art (in its shortest, by nearly one-half that of the prior art) and hence, the inner diameter of the brake drum 300 can be shortened to advantage in space.

Figure 39:
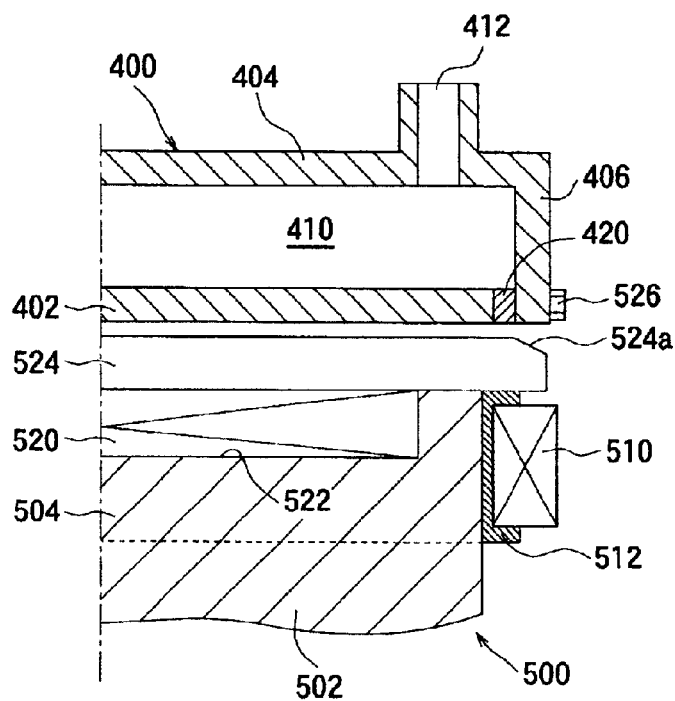
FIG. 39 is a sectional view illustrating, on an enlarged scale, a main portion of a modified embodiment of the eddy current retarder shown in FIG. 38.

FIG. 39 illustrates a modified embodiment of the eddy current retarder shown in FIG. 36. In the modified embodiment of FIG. 39, the brake drum 400 is constructed by forming a main body of a channel shape in cross section by forming, as a unitary structure, the outer peripheral wall 404, one end wall 406 and other end wall 408 by using a general steel material or aluminum, and by fastening thereto the inner peripheral wall 402 of a cylindrical shape of a low-carbon steel which is almost pure iron by using bolts 526. Here, at both ends of the inner peripheral wall 402, annular members 420 of a rectangular shape in cross section are sandwiched in the axial direction and are fastened by bolts 526. The annular members 420 are the independently formed members. It is further allowable to form the outer peripheral wall 404 by a steel pipe, weld the one end wall 406 and the other end wall 408 of an annular shape to both ends of the steel pipe by welding to form a main body, and fasten the annular members 420 to both ends of the inner peripheral wall 402 by bolts 526 in a manner of the annular members 420 being sandwiched in the axial direction, thereby to form the brake drum 400. This constitution further improves the cooling effect since the annular members 420 are partly exposed into the liquid chamber 410 so as to be brought into direct contact with the coolant. In this case, a suitable sealing means must be provided.

Figure 40:
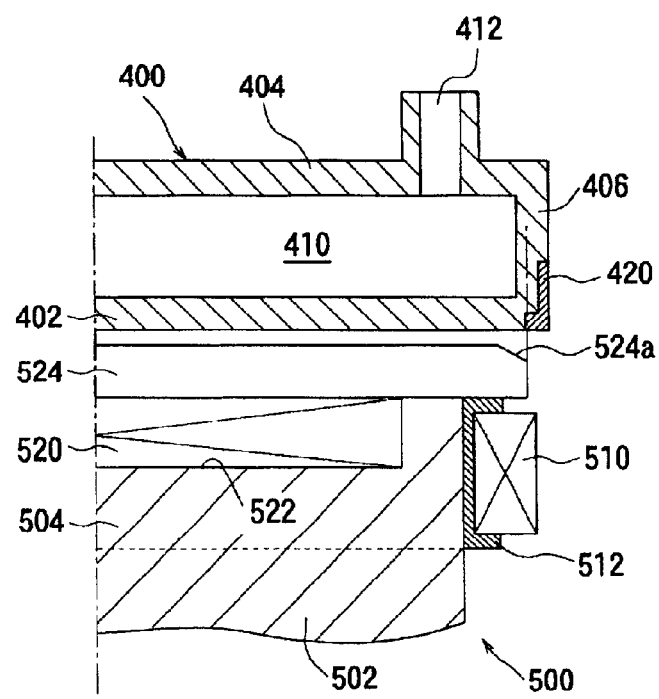
FIG. 40 is a sectional view illustrating, on an enlarged scale, a main portion of a further modified embodiment of the eddy current retarder shown in FIG. 38.

FIG. 40 illustrates another modified embodiment of the eddy current retarder shown in FIG. 38. In the modified embodiment shown in FIG. 40, the annular members 420 having an L-shape in transverse cross section as shown in FIG. 38 are coupled to the stationary brake drum 400 on the outer side of the magnetic pole piece 524 in the axial direction. In this constitution, radiation of heat from the annular members 420 is further promoted.

Figure 41:
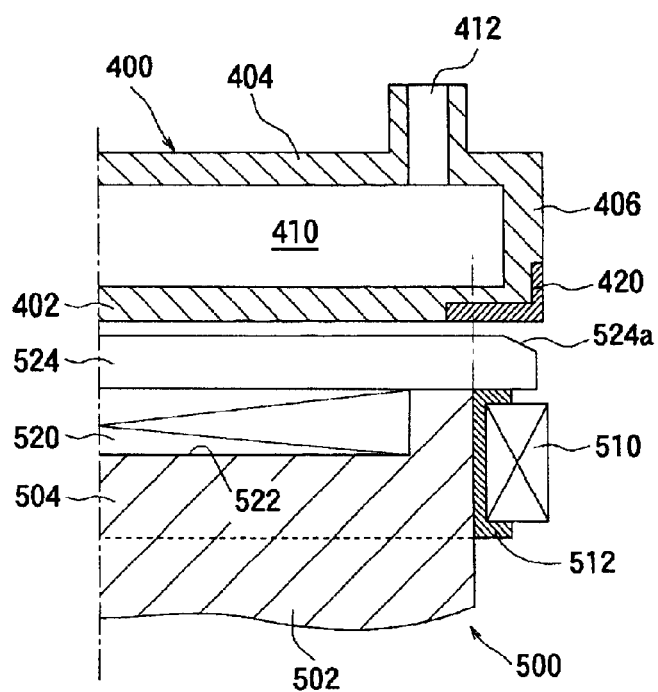
FIG. 41 is a sectional view illustrating, on an enlarged scale, a main portion of a still further modified embodiment of the eddy current retarder shown in FIG. 38.

According to a further modified embodiment of the eddy current retarder shown in FIG. 41, the annular members 420 of an L-shape in transverse cross section have a portion extending along the inner peripheral wall 402 up to positions inner than both ends in the axial direction of the iron core portion 504, enabling the eddy current to be generated in further increased amounts.

Figure 42:
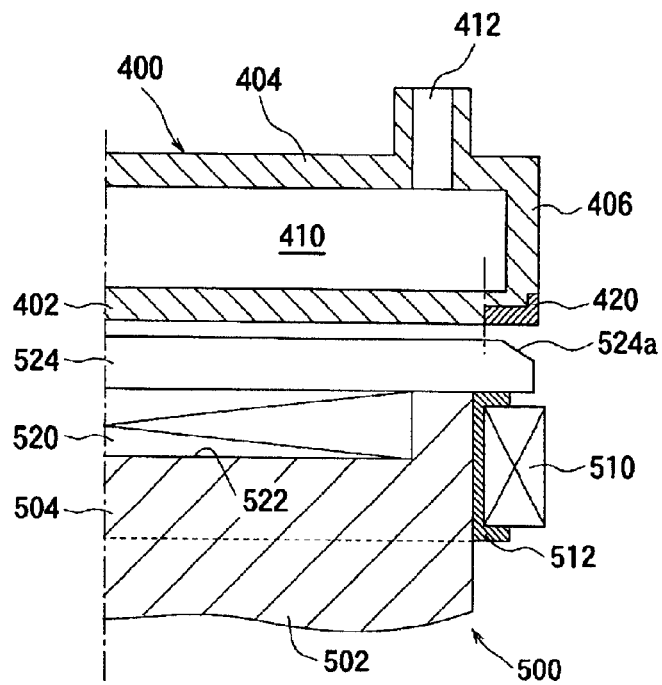
FIG. 42 is a sectional view illustrating, on an enlarged scale, a main portion of a yet further modified embodiment of the eddy current retarder shown in FIG. 38.

According to a further modified embodiment of the eddy current retarder shown in FIG. 42, the annular members 420 of an L-shape in transverse cross section have a portion extending along the inner peripheral wall 402, the portion being positioned on the outer sides of both ends in the axial direction of the iron core portion 504 and being so disposed as to be opposed to the inclined surfaces 524*a* of the magnetic pole piece 524. This constitution further improves the air-cooling efficiency of the annular members 420.

Figure 43:
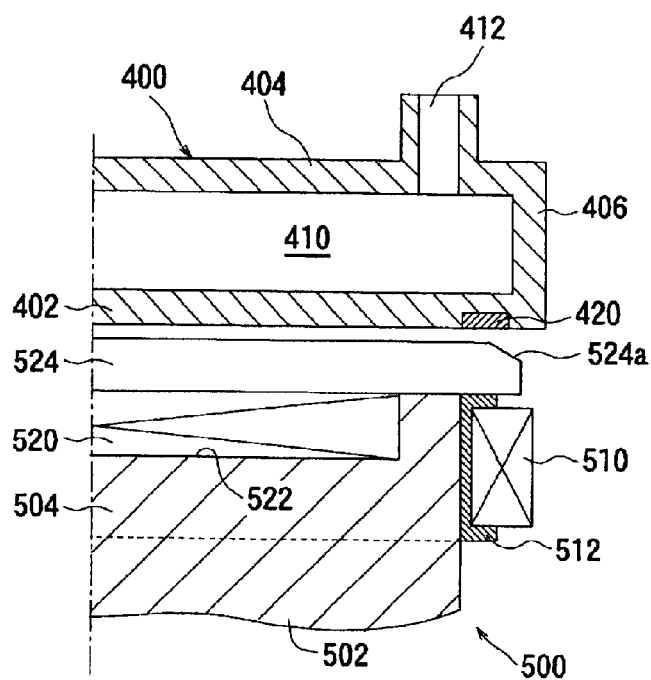
FIG. 43 is a sectional view illustrating, on an enlarged scale, a main portion of a further modified embodiment of the eddy current retarder shown in FIG. 38.

According to a further modified embodiment of the eddy current retarder shown in FIG. 43, cylindrical annular members 420 having a relatively short width are coupled to the inner peripheral surface (inner side of the inner peripheral wall 402 at a distance from both ends thereof) at both ends of the inner peripheral wall 402 in the axial direction, to further simplify the constitution.

Figure 44:
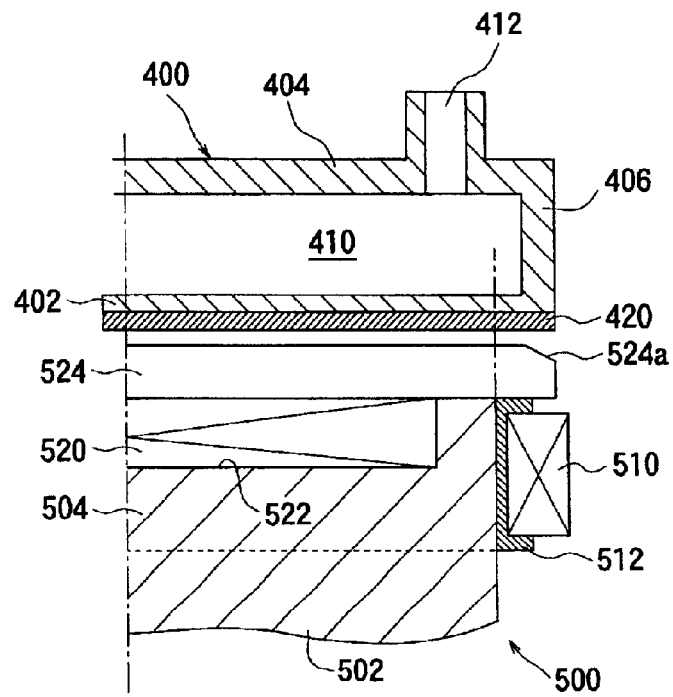
FIG. 44 is a sectional view illustrating, on an enlarged scale, a main portion of a further modified embodiment of the eddy current retarder shown in FIG. 38.

According to a further modified embodiment of the eddy current retarder shown in FIG. 44, a cylindrical annular member 420 is so coupled as to cover the whole inner peripheral surface of the brake drum 400, enabling the eddy current to be generated in further increased amounts. So far, such constitution has a possibility to cause the brake drum 400 to be heated at high temperatures. According to the present invention, however, being heated at high temperatures is prevented chiefly due to the cooling action by the coolant in the liquid chamber 410, making it possible to put this constitution into practice easily.

Figure 45:
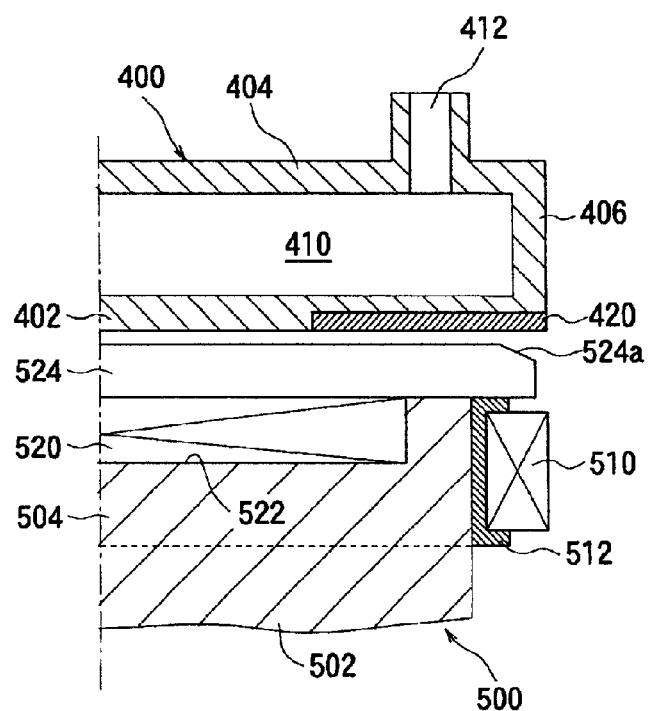
FIG. 45 is a sectional view illustrating, on an enlarged scale, a main portion of another modified embodiment of the eddy current retarder shown in FIG. 38.

According to a further modified embodiment of the eddy current retarder shown in FIG. 45, the cylindrical annular members 420 having a relatively large width are coupled to the inner peripheral surface of the brake drum 400 extending from both ends in the axial direction of the brake drum 40 up to regions of the inner peripheral wall 402, the regions being opposed to the iron core portion 504. The annular members 420 are simpler in constitution than the annular members 420 shown in FIG. 44.

Figure 46:
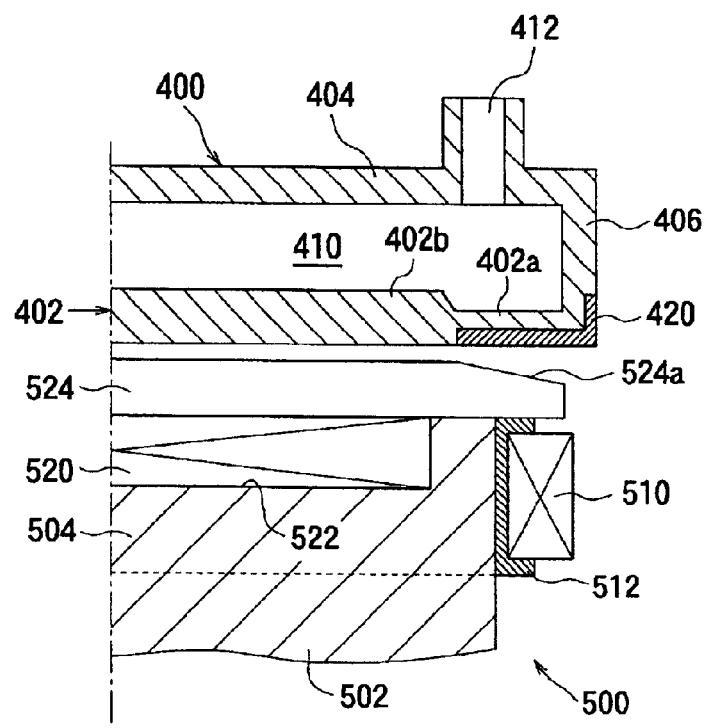
FIG. 46 is a sectional view illustrating, on an enlarged scale, a main portion of a further modified embodiment of the eddy current retarder shown in FIG. 38.

The eddy current retarder shown in FIG. 46 is a further modification from the eddy current retarder shown in FIG. 41. The inner peripheral wall 402 has a thickness larger in the intermediate region 402*b* thereof than in the regions 402*a* at both ends thereof where the annular members 420 are coupled thereto. According to this constitution, the thick portion 402*b* of the inner peripheral wall 402 has a decreased electric resistance. Therefore, eddy current generated in the intermediate thick region readily spreads in the axial direction up to the thin regions 402*a* at both ends, making it possible to further efficiently increase the braking torque.

Figure 47:
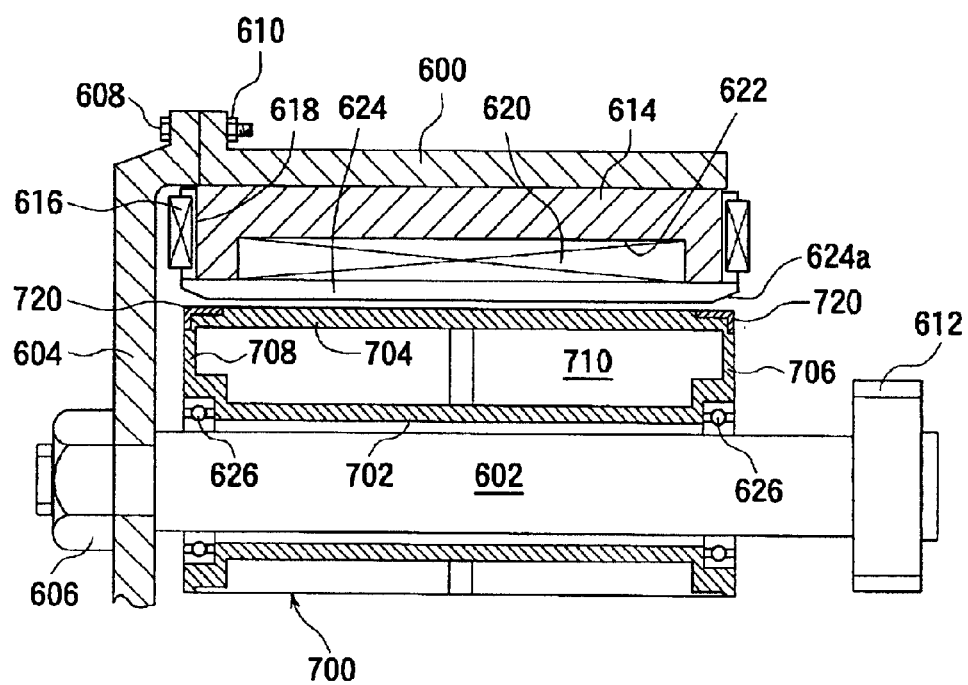
FIG. 47 is a longitudinal sectional view of a main portion illustrating, partly in an omitted manner, a further embodiment of the eddy current retarder according to the present invention.

Further embodiments of the eddy current retarder (in which annular members made of a good conductor such as copper or a copper alloy are coupled to the brake drum) of the present invention will be described with reference to FIGS. 47 to 59. Referring, first, to FIG. 47, the eddy current retarder according to the present invention comprises a magnet support cylinder 600 rotated by a rotary shaft 602 that will be described later, and a stationary brake drum 700. A mounting disk 604 is fastened, as a unitary structure, to an end of the rotary shaft 602 by nut 606. An end in the axial direction of the magnet support cylinder 600 made of a ferromagnetic material such as iron or the like is fastened to the mounting disk 604 by using bolts 608 and nuts 610. A gear 612 is coupled to the other end of the rotary shaft 602 and is brought into mesh with a gear of the output shaft of the transmission (not shown) of, for example, a truck.

On the inner periphery of the magnet support cylinder 600 are disposed plural magnets or, in this embodiments, plural composite magnets, at intervals in the circumferential direction so as to be opposed to the outer peripheral surface of the stationary brake drum 700. More specifically, iron cores 614 are coupled to the inner peripheral surface of the magnet support cylinder 600 at a distance in the circumferential direction. Electromagnetic coils 616 are disposed on the iron cores 614 via bobbins 618 made of an insulating material so as to cover the outer peripheral surfaces thereof. Electromagnets are formed by the iron cores 614 and the coils 616. In each iron core 614 is buried at least one permanent magnet 620 or, in this embodiment, the permanent magnet 620 in a number of one with the magnetic pole surface being directed in the radial direction. That is, in each iron core 614 is formed a recessed portion 622 of substantially a rectangular parallelopiped shape. Each recessed portion 622 has a predetermined depth from the end of the corresponding iron core 614 toward the outer side in the radial direction. In each recessed portion 622 of the iron core 614 is intimately inserted the permanent magnet 620 of a rectangular parallelopiped shape. The inner end surface of the permanent magnet 620 in the radial direction is positioned substantially on the end surface of the corresponding iron core 614. A magnetic pole piece 624 is secured to the end of each iron core 614 as a unitary structure. The magnetic pole piece 624 formed of the ferromagnetic material such as iron or the like has such a size as to overhang outward beyond the edges at the ends of the corresponding iron core 614. The surfaces at the peripheral edges of the magnetic pole piece 624 are opposed to the outer peripheral surface of the stationary brake drum 700 which is disposed as will be described later, and are constituted to have an inclined surface 624a which is so designed that the gap between the surfaces and the outer peripheral surface of the stationary brake drum 700 gradually increases toward the peripheral edges of the magnetic pole piece 624.

The electromagnets are formed by the above iron cores 614, corresponding coils 616 and magnetic pole pieces 624. The Nd—Fe—B based permanent magnet 620, for example, is so disposed in each recessed portion 622 of the iron core 614 that the magnetic pole surface is directed in the radial direction. The permanent magnets 620 on the magnet support cylinder 600 neighboring in the circumferential direction is disposed to have magnetic pole surfaces of which the polarities are different from each other. Further, the directions of magnetization of the iron cores 614 due to the electromagnets are defined to be in agreement with the directions of magnetic poles of the corresponding permanent magnets 620. Composite magnets are formed by the electromagnets and the corresponding permanent magnets 620.

The stationary brake drum 700 (hereinafter simply referred to as brake drum 700) comprises an inner peripheral wall 702, an outer peripheral wall 704 disposed, at a gap, on the outer side of the inner peripheral wall 702 in the radial direction, one end wall 706 connecting the end of the inner peripheral wall 702 with the end of the outer peripheral wall 704 in the axial direction, and the other end wall 708 connecting the other end of the inner peripheral wall 702 with the other end of the outer peripheral wall 704 in the axial direction. The brake drum 700 is supported by the rotary shaft 602 via a pair of bearings 626 to freely rotate relative thereto. The brake drum 700 is further secured to the transmission case (not shown) of, for example, a truck. An internal space of nearly a rectangular shape in cross section, i.e., a liquid chamber 710, is formed in the brake drum 700 by the inner peripheral wall 702, outer peripheral wall 704, one end wall 706 and other end wall 708. A coolant inlet and a coolant outlet (not shown) are formed in the liquid chamber 710. The coolant inlet, liquid chamber 710 and coolant outlet are included in a portion of the coolant circulation passage that is not shown. A coolant is fed into the liquid chamber 710 through the inlet from a coolant pump which is a coolant source (not shown), and is discharged through the outlet. The coolant pump and the coolant may be the water pump and the cooling water of the engine of the truck.

An annular members 720 made of a good conductor such as copper or a copper alloy are coupled to the inner peripheral edges and/or to the end portions in the axial direction of the brake drum 700 like the annular members 420 in the earlier embodiment. In the embodiment of the eddy current retarder shown in FIG. 47, one annular member 720 is coupled to one end in the axial direction of the brake drum 700 extending across the outer peripheral surface of the one end portion and the one end surface in the axial direction (the outer peripheral surface of the one end of the outer peripheral wall 704 and the surface of the one end wall 706 thereof) and another one is coupled to the other end portion in the axial direction of the brake drum 700 extending across the outer peripheral surface of the other end portion and the other end surface in the axial direction (across the outer peripheral surface of the other end portion of the outer peripheral wall 704 and the surface of the other end wall 708). The annular members 720 are coupled to the brake drum 700 in the same manner as that of the annular members 420 in the above-mentioned embodiment. In a state of the annular members 720 being coupled to the brake drum 700, the annular members 720 have a predetermined thickness and substantially an L-shape in transverse cross section. The outer peripheral surfaces of the annular members 720 are positioned substantially on the outer peripheral surface of the brake drum 700, and the surfaces of other portions of the annular members 720 are positioned substantially on one end surface and on the other end surface of the brake drum 700 in the axial direction.

As will be obvious from the foregoing description, the eddy current retarder shown in FIG. 47 has a basic constitution which is substantially the same as the eddy current retarder shown in FIGS. 36 to 38 except the layout in which the composite magnets disposed on the magnet support cylinder 600 are positioned on the outer side of the outer periphery of the brake drum 700, making it possible to accomplish the action and effect substantially the same as those of the above eddy current retarder.

Figure 48:
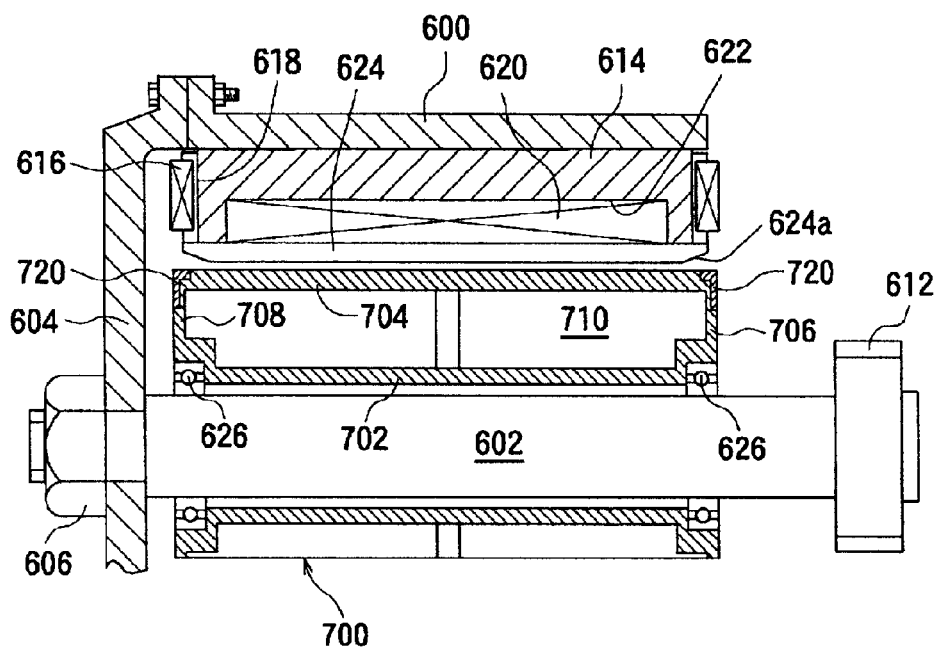
FIG. 48 is a longitudinal sectional view of a main portion illustrating a modified embodiment of the eddy current retarder shown in FIG. 47.

FIG. 48 illustrates another modified embodiment of the eddy current retarder shown in FIG. 47. In the modified embodiment of FIG. 48, the annular members 720 having an L-shape in transverse cross section as shown in FIG. 47 are coupled to the brake drum 700 on the outer sides of the magnetic pole piece 624 in the axial direction. This constitution is substantially the same as the constitution shown in FIG. 40, and makes it possible to obtain substantially the same action and effect.

Figure 49:
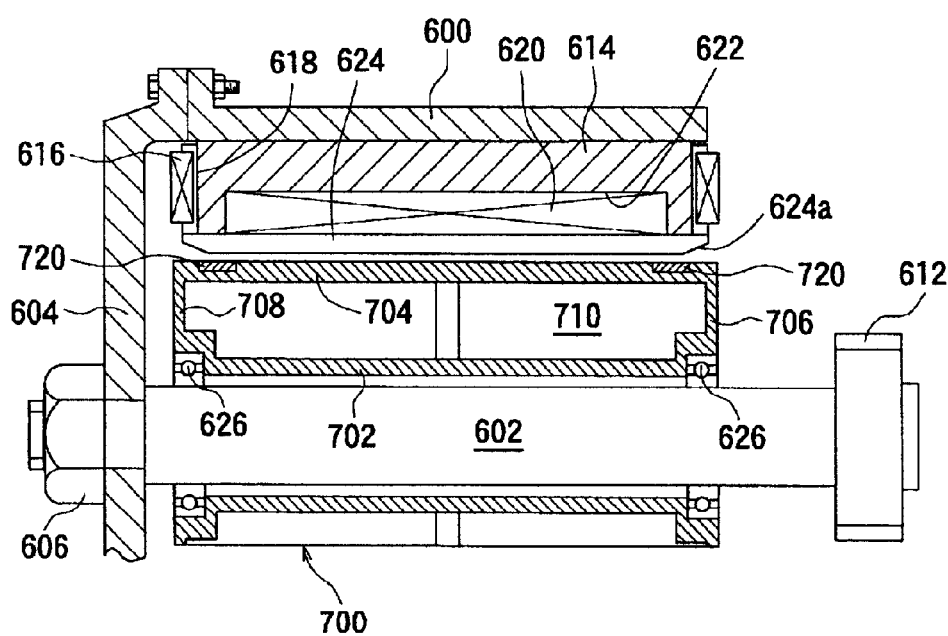
FIG. 49 is a longitudinal sectional view of a main portion illustrating a further embodiment of the eddy current retarder shown in FIG. 47.

According to a further modified embodiment of the eddy current retarder shown in FIG. 49, cylindrical annular members 720 having a relatively short width are coupled to the outer peripheral surfaces (insides at a distance from both ends of the outer peripheral wall 704) at both ends in the axial direction of the outer peripheral wall 704. This constitution is substantially the same as the constitution shown in FIG. 43, and makes it possible to obtain substantially the same action and effect.

Figure 50:
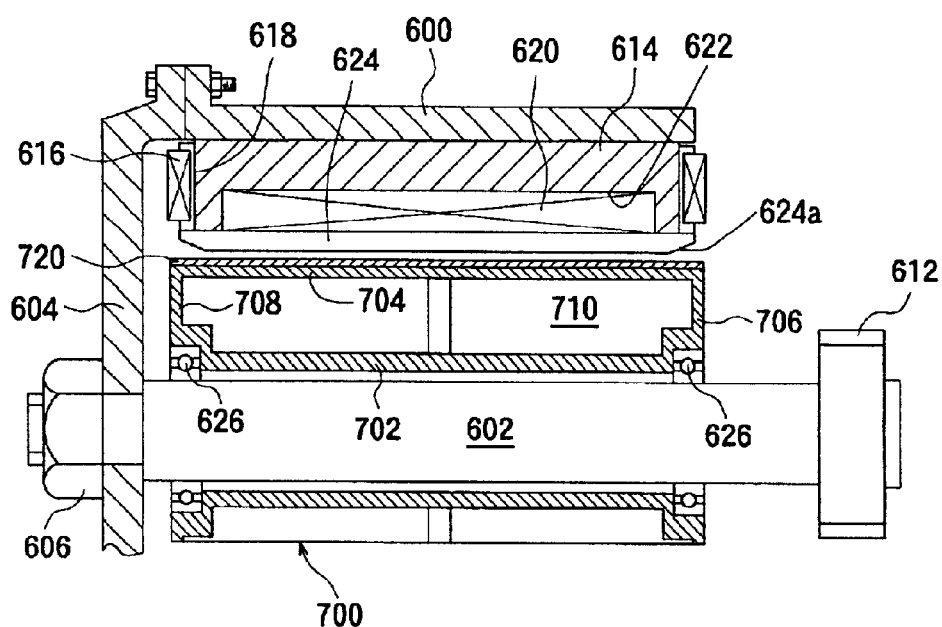
FIG. 50 is a longitudinal sectional view of a main portion illustrating a still further embodiment of the eddy current retarder shown in FIG. 47.

According to a further modified embodiment of the eddy current retarder shown in FIG. 50, the cylindrical annular member 720 is so coupled as to cover the whole outer peripheral surface of the brake drum 700. This constitution is substantially the same as the constitution shown in FIG. 44, and makes it possible to obtain substantially the same action and effect.

Figure 51:
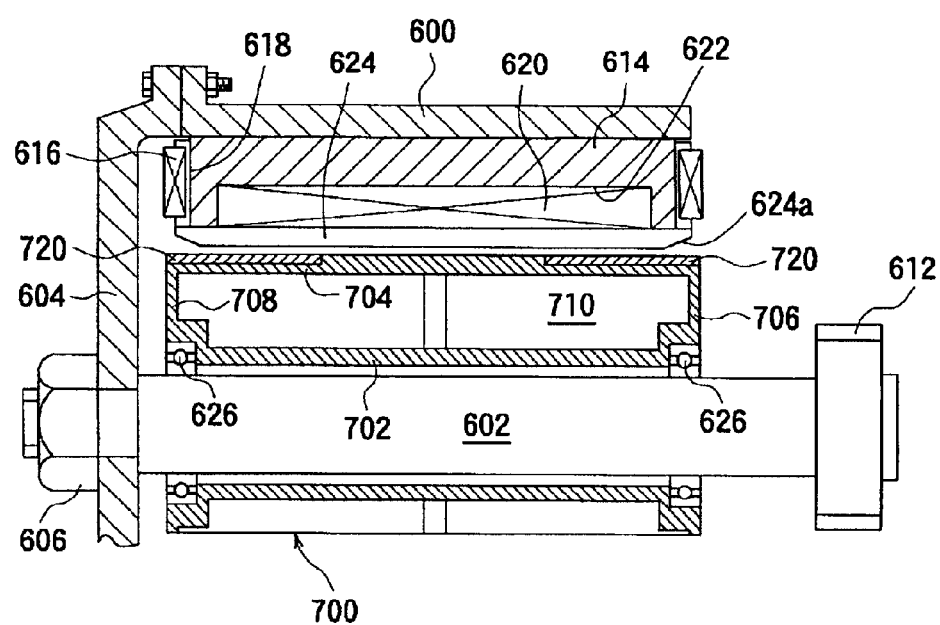
FIG. 51 is a longitudinal sectional view of a main portion illustrating a yet further embodiment of the eddy current retarder shown in FIG. 47.

According to a further modified embodiment of the eddy current retarder shown in FIG. 51, cylindrical annular members 720 having a relatively large width are coupled to the outer peripheral surface of the brake drum 700 extending from both ends of the brake drum 700 in the axial direction to the regions facing the iron core 614, of the outer peripheral wall 704. The annular members 720 according to this constitution are more simplified than the annular members 720 shown in FIG. 50.

Figure 52:
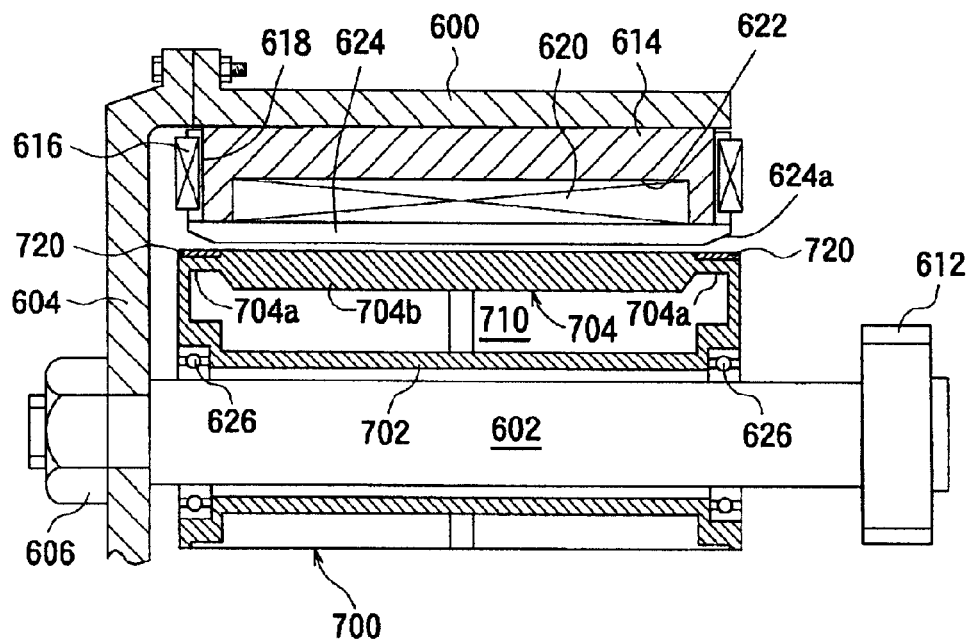
FIG. 52 is a longitudinal sectional view of a main portion illustrating a modified embodiment of the eddy current retarder shown in FIG. 47.

According to a further modified embodiment of the eddy current retarder shown in FIG. 52, cylindrical annular members 720 having a relatively short width are coupled to the outer peripheral surface (outer peripheral surface inclusive of both ends of the outer peripheral wall 704) at both ends in the axial direction of the outer peripheral wall 704. The outer peripheral wall 704 is thicker at the intermediate region 704b than the regions 704a at both ends to which the annular members 720 are coupled. This constitution is substantially the same as the constitution shown in FIG. 46, and makes it possible to obtain substantially the same action and effect.

Though not illustrated, there can be further proposed a modified embodiment in which annular members having a rectangular shape in cross section are sandwiched in both end portions of the outer peripheral wall 704 in the axial direction and are fastened by using bolts. This constitution is substantially the same as the constitution shown in FIG. 39, and makes it possible to obtain substantially the same action and effect.

Figure 53:
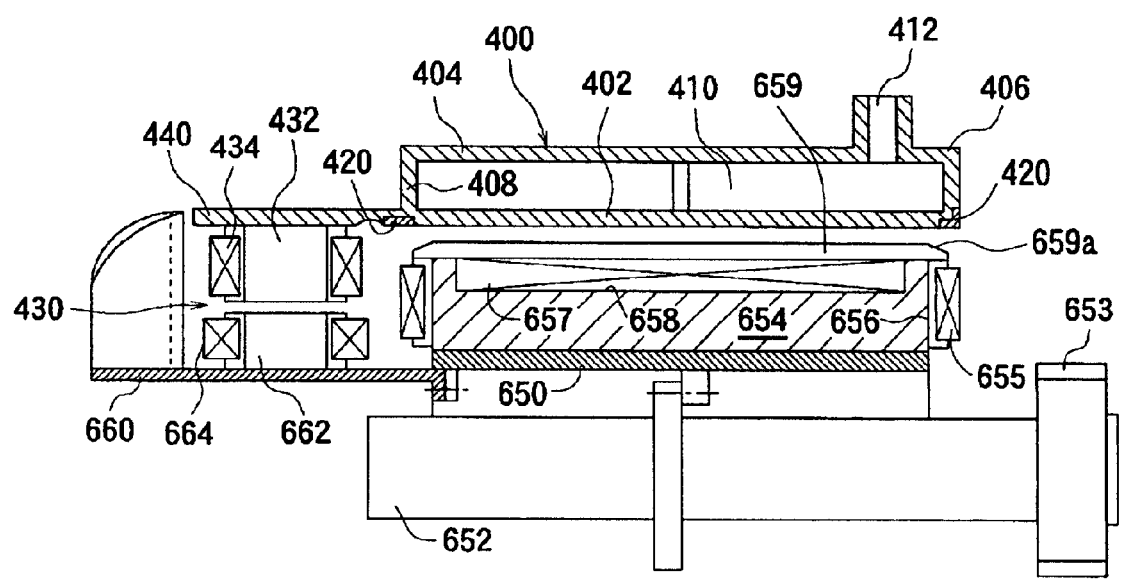
FIG. 53 is a longitudinal sectional view of a main portion illustrating, partly in an omitted manner, a further embodiment of the eddy current retarder according to the present invention.

FIG. 53 illustrates a further embodiment of the eddy current retarder according to the present invention. The eddy current retarder shown in FIG. 53 has a brake drum 400 having substantially the same constitution as the brake drum 400 shown in FIGS. 36 to 38, a magnet support cylinder 650 disposed on the inside of the brake drum 400 in the radial direction, and a generator 430. The magnet support cylinder 650 is coupled to a rotary shaft 652. A gear 653 is coupled to the rotary shaft 652 and is in mesh with a gear coupled to the output shaft of the transmission (not shown) of, for example, a truck. On the outer periphery of the magnet support cylinder 650 are disposed plural magnets or, in this embodiment, plural composite magnets at intervals in the circumferential direction so as to be opposed to the inner peripheral surface of the brake drum 400. More specifically, iron cores 654 are coupled to the outer peripheral surface of the magnet support cylinder 650 at a distance in the circumferential direction. Coils 655 are disposed on the iron cores 654 via bobbins 656 made of an insulating material so as to cover the outer peripheral surfaces thereof. Electromagnets are formed by the iron cores 654 and the coils 655. In each iron core 654 is buried at least one permanent magnet 657 or, in this embodiment, the permanent magnet 657 of a number of one with the magnetic pole surface being directed in the radial direction. That is, in each iron core 654 is formed a recessed portion 658 of substantially a rectangular parallelopiped shape. Each recessed portion 658 has a predetermined depth from the end of the corresponding iron core 654 toward the inside in the radial direction. The permanent magnet 657 having the rectangular parallelopiped shape is intimately inserted in each recessed portion 658 of the iron core 654. The outer end surface in the radial direction of the permanent magnet 657 is positioned substantially on the end surface of the corresponding iron core 654. A magnetic pole piece 659 is secured to the end of each iron core 654 as a unitary structure. Each magnetic pole piece 659 formed of the ferromagnetic material such as iron or the like has such a size that it overhangs outward beyond the edges at the ends of the corresponding iron core 654. The surfaces at the peripheral edges of each magnetic pole piece 659 facing the inner peripheral surfaces of the brake drum 400 disposed as will be described later, are constituted to have an inclined surface 659a, which is so designed that the gap between the surfaces and the inner peripheral surface of the brake drum 400 gradually increases toward the peripheral edges of the magnetic pole piece 659.

Electromagnets are formed by the iron cores 654, corresponding coils 655 and magnetic pole pieces 659. In each recessed portion 658 of the iron core 654 is disposed the Nd—Fe—B based permanent magnet 657, for example, with the magnetic pole surface being directed in the radial direction. The permanent magnets 657 neighboring in the circumferential direction on the magnet support cylinder 650 are so disposed that magnetic pole surfaces have the polarities different from each other. Further, the directions of magnetization of the iron cores 654 of the electromagnets are defined to be in agreement with the directions of magnetic poles of the corresponding permanent magnets 657. Composite magnets are formed by the electromagnets and the corresponding permanent magnets 657.

The brake drum 400 having substantially the same constitution as the brake drum 400 shown in FIGS. 36 to 38 is secured to the transmission case (not shown) of, for example, a truck. A support cylinder 440 is formed as a unitary structure at one end of the brake drum 400 in the axial direction. Plural iron cores 432 are coupled to the inner peripheral surface of the support cylinder 440 at intervals in the circumferential direction. Field coils 434 are disposed on the iron cores 432 so as to cover the outer peripheral surfaces thereof. A support cylinder 660 is coupled to an end of the magnet support cylinder 650 in the axial direction. Plural iron cores 662 are arranged on the outer peripheral surface of the support cylinder 660 at intervals in the circumferential direction so as to be opposed to the iron cores 432. Armature coils 664 are disposed on the iron cores 662 so as to cover the outer peripheral surfaces thereof. The generator 430 is constituted by the iron cores 432, field coils 434, iron cores 662 and armature coils 664.

When the support cylinder 660 rotates together with the rotary shaft 652 with a current being supplied to the field coils 434 of the generator 430, an electric power generates at the terminals of the armature coils 664. The electric power at the terminals of the armature coils 664 is rectified, controlled for its current and voltage, and is supplied to the field coils 434 of the generator 430 and to the coils 655 of the eddy current retarder. In this eddy current retarder, therefore, the load of the generator 430 and the braking torque produced based on the eddy current generated between the composite magnets and the brake drum 400, are applied to the rotary shaft 652 to further improve the braking performance.

In the eddy current retarder shown in FIG. 53, too, the pair of annular members 420 are coupled to the brake drum 400 in a manner as described above, to obtain enhanced braking performance as described above.

Figure 54:
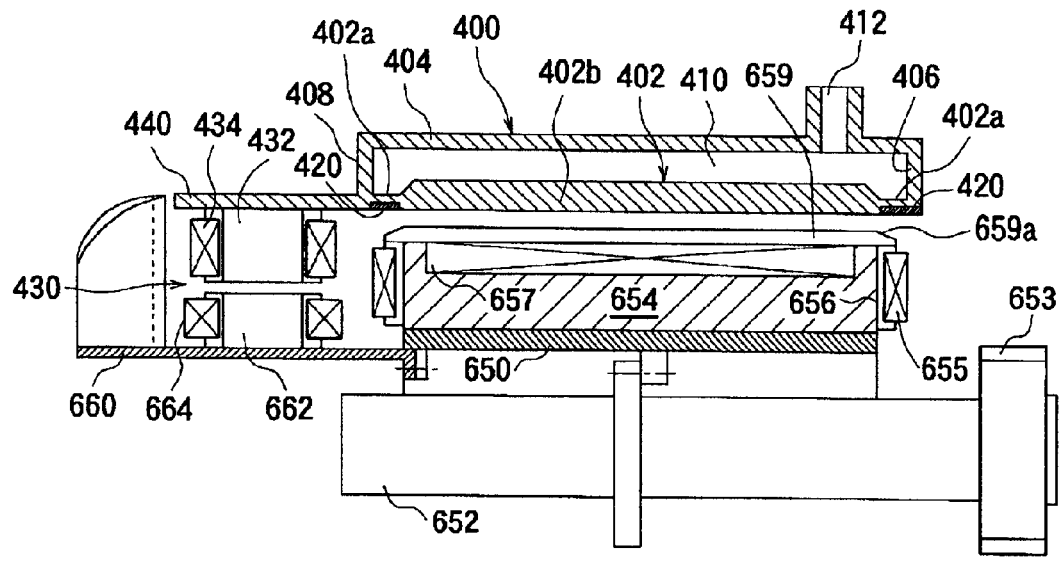
FIG. 54 is a longitudinal sectional view of a main portion illustrating a modified embodiment of the eddy current retarder shown in FIG. 53.

FIG. 54 illustrates a modified embodiment of the eddy current retarder shown in FIG. 53. In this eddy current retarder, the brake drum 400 is constituted in substantially the same manner as the constitution shown in FIG. 46. Therefore, the eddy current retarder exhibits substantially the same action and effect as the eddy current retarder shown in FIG. 46.

Figure 55:
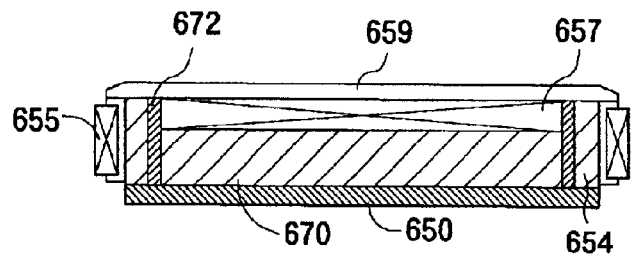
FIG. 55 is a longitudinal sectional view illustrating a modified embodiment of the composite magnet used in the eddy current retarder according to the present invention.

FIG. 55 illustrates a modified embodiment of the composite magnet (modified embodiment of the composite magnet shown in FIG. 53) used in the eddy current retarder of the present invention. In this composite magnet, the iron core 654 is formed in a cylindrical shape. A permanent magnet 657 and a ferromagnetic member 670 are, first, fitted into a cylindrical frame 672 made of a nonmagnetic material and are, then, inserted into the iron core 654 in a set. The cylindrical frame 672 can be made of a nonmagnetic material such as aluminum, an austenite-type stainless steel or a heat-resistant synthetic resin. A magnetic pole piece 659 is coupled to the ends of the permanent magnet 657, cylindrical frame 672 and iron core 654 which are positioned in flush. The iron core 654 and the ferromagnetic material 670 are coupled at the other ends to the magnet support cylinder 650.

Figure 56:
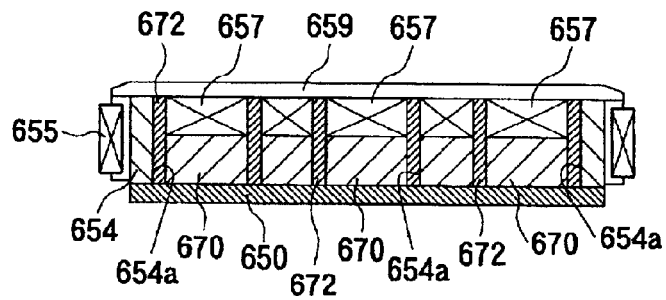
FIG. 56 is a longitudinal sectional view illustrating another embodiment of the composite magnet used in the eddy current retarder according to the present invention.

FIG. 56 illustrates a modified embodiment of the composite magnet (modified embodiment of the composite magnet shown in FIG. 55) used in the eddy current retarder of the resent invention. In this composite magnet, the iron core 654 which is formed of a block has plural through holes 654a. The permanent magnet 657 and the ferromagnetic material 670 are, first, fitted into the cylindrical frame 672 made of a nonmagnetic material and are, then, inserted in each through hole 654a of the iron core 654 in a set. A magnetic pole piece 659 is coupled to the ends of the permanent magnet 657 and the iron core 654 which are positioned in flush. The iron core 654 and the ferromagnetic material 670 are coupled at the other ends to the magnet support cylinder 650.

Figure 57:
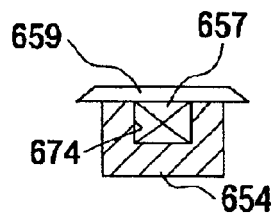
FIG. 57 is a longitudinal sectional view illustrating an embodiment of a permanent magnet assembly that can be used in the eddy current retarder according to the present invention.

FIG. 57 illustrates an embodiment of a permanent magnet assembly used in the eddy current retarder according to the present invention. The permanent magnet assembly is constituted by the iron core 654, permanent magnet 657 and magnetic pole piece 659. A recessed portion 674 of substantially a rectangular parallelopiped shape is formed in the iron core 654. The recessed portion 674 has a predetermined depth from the end of the iron core 654 toward the inside thereof. In the recessed portion 674 of the iron core 654 is intimately inserted the permanent magnet 657 having a rectangular parallelopiped shape. The outer end surface of the permanent magnet 657 is positioned substantially on the end surface of the iron core portion 654. The magnetic pole piece 659 is secured to the end of the iron core 654 as a unitary structure.

Figure 58:
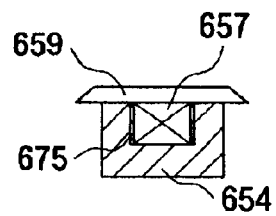
FIG. 58 is a longitudinal sectional view illustrating a modified embodiment of the permanent magnet assembly shown in FIG. 57.
Figure 59:
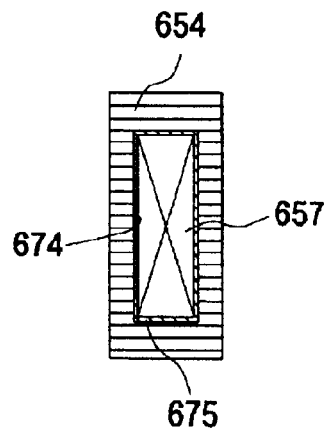
FIG. 59 is a transverse sectional view of the permanent magnet assembly shown in FIG. 58.

FIGS. 58 and 59 illustrate a modified embodiment of the permanent magnet assembly shown in FIG. 57. In this permanent magnet assembly, the permanent magnets 657 are, first, inserted in the cylindrical frame 675 made of the nonmagnetic material and are, then, inserted in the recessed portions 674 of the iron cores 654 in a set. The cylindrical frame 675 can be made of the same nonmagnetic material as that of the cylindrical frame 672 described earlier. The magnetic pole piece 659 is coupled to the ends of the permanent magnet 657, cylindrical frame 675 and iron core 654 positioned in flush.

In the eddy current retarder equipped with the permanent magnet assembly shown in FIGS. 57 to 59, a change over between the non-braking and braking can be done by moving the support means such as the support member, the support cylinder or the like for supporting the permanent magnets outward from, or inward to, the brake drum or turning them forward or reverse inside the brake drum by using an actuator.

Further, in the embodiments of the eddy current retarder shown in FIGS. 36 to 43, FIGS. 45 to 49 and FIGS. 51 to 54, the annular members 420 are arranged at both ends of the brake drum 400 or 700 in the axial direction. However, the essential actions and effects of the invention can be accomplished if they are arranged at least on one side in the axial direction.

In the above-mentioned eddy current retarder described with reference to FIGS. 36 to 46, the cylindrical main body 502 of the magnet support member 500 and the iron core portions 504 are formed by punching as a unitary structure a laminate of plural electromagnetic steel plates by a press, and the magnetic pole pieces 524 are secured to the ends of the iron core portions 504. However, there can be further proposed an embodiment in which the cylindrical main body 502, iron core portions 504 and magnetic pole pieces 524 are formed by punching as a unitary structure a laminate of plural electromagnetic steel plates by a press. In this case, an overhang portion of the magnetic pole pieces 524 beyond the iron core portions 504 is formed only in the circumferential direction.

What is claimed is:

1. An eddy current retarder, comprising a rotary shaft, a brake drum coupled to the rotary shaft, and stationary magnet unit disposed on the inside of the brake drum in the radial direction, wherein the stationary magnet unit comprises:

an annular base portion;

a plurality of iron core portions extending outward in the radial direction from the outer peripheral edge of the base portion and spaced at intervals in the circumferential direction;

a plurality of coils wound on the outer peripheral surfaces of respective pairs of the plurality of iron core portions;

magnetic pole pieces arranged at the ends of the iron core portions so as to be opposed to the inner peripheral surface of the brake drum;

the iron core portions and the coils forming a plurality of electromagnets; and at least one permanent magnet buried in the iron core portion of each of said electromagnets, with the magnetic pole surfaces being directed in the radial direction;

wherein said eddy current retarder produces a braking force in the brake drum only when an electric current is supplied to the coils to cause an eddy current to be generated by a magnetic field due to the electromagnets and the corresponding permanent magnets.

2. An eddy current retarder according to claim 1, wherein each of the magnetic pole pieces comprises a plurality of electromagnetic steel plates laminated together in the axial direction.

3. An eddy current retarder according to claim 1, wherein each of the magnetic pole pieces comprises a plurality of electromagnetic steel plates laminated together in the axial direction and divided in the circumferential direction.

4. An eddy current retarder according to claim 1, further comprising a plurality of electrically conductive annular members disposed on the inner peripheral surfaces and/or on the end surfaces of the brake drum.

5. An eddy current retarder according to claim 1, wherein each of the magnetic pole pieces comprises a plurality of blocks laminated together in the axial direction.

6. An eddy current retarder according to claim 1, wherein each of the magnetic pole pieces comprises a plurality of blocks stacked together in the axial direction and divided in the circumferential direction.

7. An eddy current retarder according to claim 1, further comprising a stationary frame, including a plurality of annular support plates, wherein the stationary magnet unit and the stationary frame comprise a unitary structure.

8. An eddy current retarder according to claim 1, wherein said annular base portion comprises an annular stationary support cylinder.

* * * * *